United States Patent
Lester et al.

(10) Patent No.: US 12,304,988 B2
(45) Date of Patent: *May 20, 2025

(54) ACRYLIC POLYMERS HAVING CONTROLLED PLACEMENT OF FUNCTIONAL GROUPS

(71) Applicant: Avery Dennison Corporation, Mentor, OH (US)

(72) Inventors: Christopher L. Lester, Mill Hall, PA (US); Brandon S. Miller, Lock Haven, PA (US); Michael J. Zajaczkowski, Bellefonte, PA (US); William L. Bottorf, Mill Hall, PA (US); Kyle R. Heimbach, Milmont, PA (US)

(73) Assignee: Avery Dennison Corporation, Mentor, OH (US)

( * ) Notice: Subject to any disclaimer, the term of this patent is extended or adjusted under 35 U.S.C. 154(b) by 1042 days.

This patent is subject to a terminal disclaimer.

(21) Appl. No.: 17/320,949

(22) Filed: May 14, 2021

(65) Prior Publication Data
US 2022/0041784 A1   Feb. 10, 2022

Related U.S. Application Data

(63) Continuation of application No. 12/933,454, filed as application No. PCT/US2009/037800 on Mar. 20, 2009, now Pat. No. 11,034,787.

(60) Provisional application No. 61/157,390, filed on Mar. 4, 2009, provisional application No. 61/038,063, filed on Mar. 20, 2008.

(51) Int. Cl.
| | |
|---|---|
| *C08F 293/00* | (2006.01) |
| *C08F 2/38* | (2006.01) |
| *C08F 4/00* | (2006.01) |
| *C08F 4/04* | (2006.01) |
| *C08F 4/06* | (2006.01) |
| *C08F 220/12* | (2006.01) |
| *C08L 53/00* | (2006.01) |
| *C09J 153/00* | (2006.01) |

(52) U.S. Cl.
CPC ............ *C08F 293/005* (2013.01); *C08F 2/38* (2013.01); *C08F 4/00* (2013.01); *C08F 4/04* (2013.01); *C08F 4/06* (2013.01); *C08F 220/12* (2013.01); *C08L 53/00* (2013.01); *C09J 153/00* (2013.01); *C08F 2438/02* (2013.01); *C08F 2438/03* (2013.01); *C08L 2666/02* (2013.01)

(58) Field of Classification Search
CPC .......... C08F 293/005; C08F 2/38; C08F 4/00; C08F 4/04; C08F 4/06; C08F 220/12; C08F 2438/02; C08F 2438/03; C08F 20/18; C08L 53/00; C08L 2666/02; C08L 33/05; C09J 153/00; C09J 133/08; C08J 153/00

See application file for complete search history.

(56) References Cited

U.S. PATENT DOCUMENTS

| | | | |
|---|---|---|---|
| 4,912,169 | A | 3/1990 | Whitmire et al. |
| 5,602,221 | A | 2/1997 | Bennett et al. |
| 6,180,691 | B1 | 1/2001 | Cheng et al. |
| 6,465,591 | B1 | 10/2002 | Lee |
| 6,569,949 | B1 | 5/2003 | Lee et al. |
| 6,596,899 | B1 | 7/2003 | Lai |
| 6,608,134 | B1 | 8/2003 | Tobing et al. |
| 6,706,836 | B1 | 3/2004 | Holguin et al. |
| 6,743,880 | B2 | 6/2004 | Holguin |
| 6,780,231 | B2 | 8/2004 | Scholz et al. |
| 6,828,339 | B2 | 12/2004 | Ettema et al. |
| 6,844,391 | B1 | 1/2005 | Iyer et al. |
| 6,953,602 | B2 | 10/2005 | Carte et al. |
| 7,019,067 | B2 | 3/2006 | Holguin et al. |
| 7,407,694 | B2 | 8/2008 | Taniguchi |
| 7,459,193 | B2 | 12/2008 | Utz |
| 8,431,652 | B2 | 4/2013 | Balk et al. |
| 8,895,669 | B2 | 11/2014 | Balk et al. |
| 9,644,063 | B2 | 5/2017 | Miller et al. |
| 2002/0086950 | A1 | 7/2002 | Walter |
| 2004/0097658 | A1 | 5/2004 | Everaerts et al. |
| 2004/0266965 | A1 | 12/2004 | Holguin et al. |
| 2005/0053790 | A1 | 3/2005 | Kato |
| 2005/0085592 | A1 | 4/2005 | Taniguchi et al. |
| 2006/0089423 | A1 | 4/2006 | Ueno et al. |
| 2006/0173142 | A1 | 8/2006 | Hildeberto et al. |
| 2006/0263600 | A1 | 11/2006 | Bartholomew et al. |
| 2006/0286302 | A1 | 12/2006 | Ma et al. |
| 2007/0009582 | A1 | 1/2007 | Madsen et al. |
| 2007/0049696 | A1 | 3/2007 | Gonzalez Montiel et al. |
| 2007/0149709 | A1 | 6/2007 | Parker |
| 2008/0214712 | A1 | 9/2008 | Passade Boupat et al. |
| 2009/0130363 | A1 | 5/2009 | Utz |

(Continued)

FOREIGN PATENT DOCUMENTS

| | | |
|---|---|---|
| CN | 101528782 | 9/2009 |
| CN | 101248093 | 1/2011 |

(Continued)

OTHER PUBLICATIONS

Handbook of Pressure Sensitive Adhesive Technology, Von Nostrand Reinhold, Co, Chap. 20, pp. 527-584 (1989).

(Continued)

*Primary Examiner* — K. Boyle

(57) ABSTRACT

Acrylic copolymers that include the controlled placement of functional groups within the polymer structure are provided. The copolymers contain a reactive segment and a non-reactive segment and are manufactured via a controlled radical polymerization process. The copolymers are useful in the manufacture of adhesives and elastomers.

36 Claims, 9 Drawing Sheets

(56) References Cited

U.S. PATENT DOCUMENTS

| | | |
|---|---|---|
| 2009/0171459 A1 | 7/2009 | Linhardt et al. |
| 2009/0270559 A1 | 10/2009 | Schmidt et al. |
| 2010/0047620 A1 | 2/2010 | Decker et al. |
| 2010/0280182 A1 | 11/2010 | Balk et al. |
| 2011/0177302 A1 | 7/2011 | Satoshi |
| 2013/0059971 A1 | 3/2013 | Miller |
| 2013/0281574 A1 | 10/2013 | Li et al. |
| 2014/0329958 A1 | 11/2014 | Lester |

FOREIGN PATENT DOCUMENTS

| | | |
|---|---|---|
| CN | 102037091 | 4/2011 |
| CN | 101641418 | 9/2012 |
| CN | 101180376 | 11/2012 |
| EP | 0248596 | 2/1990 |
| EP | 0404377 | 12/1990 |
| EP | 1211270 | 6/2002 |
| JP | 10-298248 | 11/1998 |
| JP | 2006-506505 | 2/2006 |
| JP | 2008-546873 | 12/2008 |
| JP | 2009-108203 | 5/2009 |
| KR | 10-2009-0024188 | 3/2009 |
| KR | 10-2009-0024189 | 3/2009 |
| KR | 10-2010-0137520 | 12/2010 |
| RU | 2008143542 | 5/2010 |
| RU | 2559893 | 8/2015 |
| WO | 1998/01478 | 1/1998 |
| WO | 1999/05099 | 2/1999 |
| WO | 1999/31144 | 6/1999 |
| WO | 03/055919 | 7/2003 |
| WO | 2006/106277 | 10/2006 |
| WO | 2007/023375 | 3/2007 |
| WO | 2007/140225 | 12/2007 |
| WO | 2008/012116 | 1/2008 |
| WO | 2009/117654 | 9/2009 |
| WO | 2011/146450 | 11/2011 |

OTHER PUBLICATIONS

"The Chemistry of Radical Polymerization", Graeme Moad & David H. Solomon, 2nd rev. ed., 2006, Elsevier, p. 508-514.
International Preliminary Report on Patentability issued in corresponding IA No. PCT/US2009/037800 dated Sep. 30, 2010.
International Search Report and Written Opinion issued in corresponding IA No. PCT/US2009/037800 dated May 28, 2009.
International Search Report and Written Opinion issued in corresponding IA No. PCT/US2011/036769 dated Aug. 1, 2011.
International Preliminary Report on Patentability issued in corresponding IA No. PCT/US2011/036769 dated Nov. 29, 2012.
Titow, M.V., PVC Technology, Springer Science & Business Media, p. 960 and 962, Dec. 6, 2012.
Benedek, I., "Pressure-Sensitive Adhesives and Applications," CRC Press, p. 92-92, Feb. 2004.
Braunecker et al., "Controlled/Living Radical Polymerization: Features, Developments, and Perspectives," Progress in Polymer Science, vol. 33, Issue 1, p. 165 (2008).
Wang, J., Matyjaszewski, K., "Controlled/"Living" Radical Polymerization. Atom Transfer Radical Polymerization in the Presence of Transition-Metal Complexes", J. Am. Chem. Soc., 117: 5614-5615 (1995).
Cowie, J. M. G., Arrighi, V., Polymers: Chemistry and Physics of Modern Materials, CRC Press Taylor and Francis Group: Boca Raton, Fl, 2008, 3rd Ed., pp. 82-84.
Odian, G., Radical Chain Polymerization; Principles of Polymerization, Wiley-Interscience: Staten Island, New York, 2004, pp. 316-321.
Matyjaszewski, K., Xia, J., "Atom Transfer Radical Polymerization", Chem. Rev., 101 (9):2921-2990 (2001).
Mayadunne et al., "Living Radical Polymerization with Reversible Addition-Fragmentation Chain Transfer (RAFT Polymerization) Using Dithiocarbamates as Chain Transfer Agents," Macromolecules, 32 (21), p. 6977-6980, (1999).
Matyjaszewski et al., "Simple and Efficient Synthesis of Various Alkoxyamines for Stable Free Radical Polymerization," Macromolecules, 31 (17), p. 5955-5957, (1998).
Patten, T. E., Matyjaszewski, K., "Atom Transfer Radical Polymerization and the Synthesis of Polymeric Materials", Adv. Mater., 10: 901 (1998).
Chiefari et al., Living Free-Radical Polymerization by Reversible Addition-Fragmentation Chain Transfer: The RAFT Process, Macromolecules, 31 (16), p. 5559-5562, (1998).
International Search Report and Written Opinion issued in corresponding IA No. PCT/US2012/059849 dated Dec. 4, 2012.
International Preliminary Report on Patentability issued in corresponding IA No. PCT/US2012/059849 dated Apr. 24, 2014.
Jiang P et al., "Synthesis of well-defined glycidyl methacrylate based block copolymers with self-activation and self-initiation behaviors via ambient temperature atom transfer radical polymerization", Journal of Polymer Science Part A: Polymer Chemistry, 2007, vol. 45, pp. 2947-2958.
Yan et al., "Dual-sensing porphyrin-containing copolymer nanosensor as full-spectrum colorimeter and ultra-sensitive thermometer," Chemical Communications, 2010, 46, 2781-2783.
Kenawy et al., "Biologically active polymers v. sythesis and antimicrobial activity of modified poly(glycidyl methacrylate-co-2-hydroxyethyl methacrylate) derivatives with quaternary ammonium and phosphonium salts," Journal of Polymer Science: Part A, Polymer Chemistry, vol. 40, 2384-2393, 2002.
Fan et al., "Synthesis of SAN-containing block copolymers using RAFT polymerization," Journal of Polymer Science, Part A, 2006, 44, 2260-2269.
Schilli et al., "A new double-responsive block copolymer synthesized via RAFT polymerization: poly(n-isopropylacrylamide)-block-poly(acrylic acid)," Macromolecules 2004, 37, 7861-7866.
Schmitz et al., "Synthesis and aggregation behaviour of amphiphilic block copolymers with random middle block," Colloid Polymer Science, 2009, 287:1183-1193.
Hu Y., Paul C.W., Block Copolymer-Based Hot-Melt Pressure-Sensitive Adhesives in: Technology of Pressure-Sensitive Adhesives and Products (Handbook of Pressure-Sensitive Adhesives and Products) Edited by Istvan Benedek and Mikhail M. Feldstein, CRC Press 2008, pp. 3-6 and pp. 3-7.
Waly et al., Die Angewandte Makromolekulare Chemi, 103, pp. 61-76, 1982.
Yu et al., "Poly[glycidyl methacrylate (GMA)/methylmethacrylate (MMA)-b-Butadiene (B)-b-GMA/MMA] Reactive Thermoplastic Elastomers: Synthesis and Characterization", Journal of Polymer Science: Part A: Polymer Chemistry, vol. 35, pp. 3507-3515, 1997.
Zhan et al., "Effect of Block Order of ABA- and BAB-Type NIPAAm/HEMA Triblock Copolymers on Thermoresponsive Behavior of Solutions," Macromolecular Chemistry and Physics, 208, 1773-1781, 2007.

ACRYLIC POLYMERS HAVING CONTROLLED PLACEMENT OF FUNCTIONAL GROUPS

CROSS-REFERENCE TO RELATED APPLICATIONS

The present application claims the benefit of U.S. Provisional Patent Application Nos. 61/038,063 filed Mar. 20, 2008, and 61/157,390 filed Mar. 4, 2009, both of which are incorporated herein by reference in their entireties.

BACKGROUND OF THE INVENTION

The invention relates to acrylic polymers, and in particular, to acrylic copolymers that include the controlled placement of functional groups within the polymer structure. The copolymers are useful in the manufacture of adhesives and elastomers.

(Meth)acrylic (co)polymers have been studied and used industrially for more than 50 years. Due to the wide range of monomers (meth)acrylic (co)polymers display a significant array of viscoelastic properties that lend themselves well to applications in adhesives and elastomers. When compared to other copolymers that are used for similar purposes as (meth)acrylics, several significant advantages of (meth)acrylics become apparent. For example relative to natural rubber and styrene block copolymers (meth)acrylic copolymers have superior optical clarity, UV stability, and temperature and oxidative resistance. State of the art (meth) acrylic copolymers meet many performance characteristics by virtue of their high molecular weight and cross-linking reactions. Because of the wide array of copolymerizable monomers (meth)acrylic polymers have tailorable polarity and the ability to undergo a variety of cross-linking reactions. Typically high performance (meth)acrylic copolymers are processed with large amounts of organic solvents.

Increasingly there are significant economic and regulatory pressures for producers of solvent acrylic polymers to reduce the use of organic solvents in their processes. In particular, it is common for solvent acrylic polymers in adhesive applications to be coated from solutions averaging only 30-40% polymer. The solvent has to be evaporated and then either collected or incinerated, all of which are energy intensive and costly operations. Additionally, removal of solvent from thick adhesive films may produce defects in the dry adhesive film.

Control of polymer architecture is often the subject of intensive research with the goal of improving performance for ever increasingly challenging applications. Architectures that acrylic polymers are known to possess include block copolymers, telechelic polymers, and random polymers of controlled molecular weight. Even though the advances in controlling architecture have occurred with many benefits, each of these particular architectural types has disadvantages. For example, block copolymers have high melt viscosities which require high processing temperatures, making it difficult to control reactivity of functional groups. The production of telechelic polymers often involves multiple steps. Telechelics involve the placement of a reactive functional group exclusively on the end terminus of a polymer and not elsewhere in the polymer backbone. Functional groups placed at the end termini of polymers serve solely to increase the linear molecular weight in a manner in which free polymer chain ends are eliminated. As a result, telechelic polymers can yield high strength materials but do not provide the viscoelastic properties critical to adhesives and some elastomer applications. Random polymers of controlled molecular weight require high amounts of cross-linking to attain network formation.

In the past 15-20 years a variety of controlled radical polymerization techniques have been developed to afford good architectural control of (meth)acrylic monomers. These techniques typically are tolerant to a wide variety of monomers and functional groups as opposed to previous techniques like anionic or group transfer polymerization. A substantial amount of fundamental research has been performed to understand these types of polymerization and a thorough review has been edited by Matyjewski. Reversible addition fragmentation chain transfer (RAFT) polymerization is one such technique that has been shown to work exceedingly well with a wide variety of (meth)acrylic monomers yielding excellent control of molecular weight and polydispersity. The RAFT mechanism for controlled polymerization is well understood and reported extensively. While some examples of controlled architecture acrylic PSAs have been reported very little work has been done to explore the influence of reactive functional group placement.

SUMMARY OF THE INVENTION

This invention solves the problems associated the previously known architectured polymers by placement of crosslinkable monomers into segments of the polymer of controlled molecular weight and position. The overall molecular weight is low which yields desirable low viscosity, high solids solutions and melts. In conjunction with the good processability, high performance elastomers and adhesives are obtained upon cross-linking. In particular, the cross-linkable monomers are placed in specific segments of the polymer backbone so that the cross-link density is controlled for optimal performance. The compositions of the present invention contain no undesired heterogeneity prior to cross-linking. A further benefit is that in all embodiments of the invention, the polymer chain ends are preserved to yield desired visco-elastic and surface properties. To control the placement of cross-linkable monomers, it is necessary to employ a controlled free-radical polymerization technique. In contrast with standard free radical processes it is impossible to control the placement of cross-linkable monomers.

In one embodiment of the invention there is provided a crosslinkable composition comprising: at least one acrylic copolymer comprising at least one reactive segment of controlled size and position and at least one non-reactive segment of controlled size and position, the reactive segment comprising at least one monomer having at least one reactive functional group capable of undergoing a crosslinking reaction, wherein the functional group is in a non-terminal position in the copolymer, the non-reactive segment being non-reactive with the reactive functional group of the reactive segment, wherein the reactive segment and the non-reactive segment are molecularly miscible before cure.

The acrylic copolymer may comprise multiple non-reactive segments and/or multiple reactive segments. For example, the copolymer may comprise two reactive segments and one non-reactive segment, or one reactive segment and two non-reactive segments, or two reactive segments and two non-reactive segments, etc. In one embodiment, the reactive segments may be positioned on either side of a central non-reactive segment on the polymer chain. In an alternative embodiment, non-reactive segments may be positioned on either side of a central reactive segment.

A further embodiment of the invention includes the use of controlled radical polymerization for the synthesis of novel acrylic polymers of controlled molecular weight, and placement of reactive functional groups. These types of architectured acrylic polymers afford the development of high performance pressure sensitive adhesives at high solids in organic solvents at moderate to low viscosities. Furthermore, with either complete removal of the solvent or via bulk polymerization 100% solids warm melt compositions are possible.

DETAILED DESCRIPTION OF THE INVENTION

Figure 1:
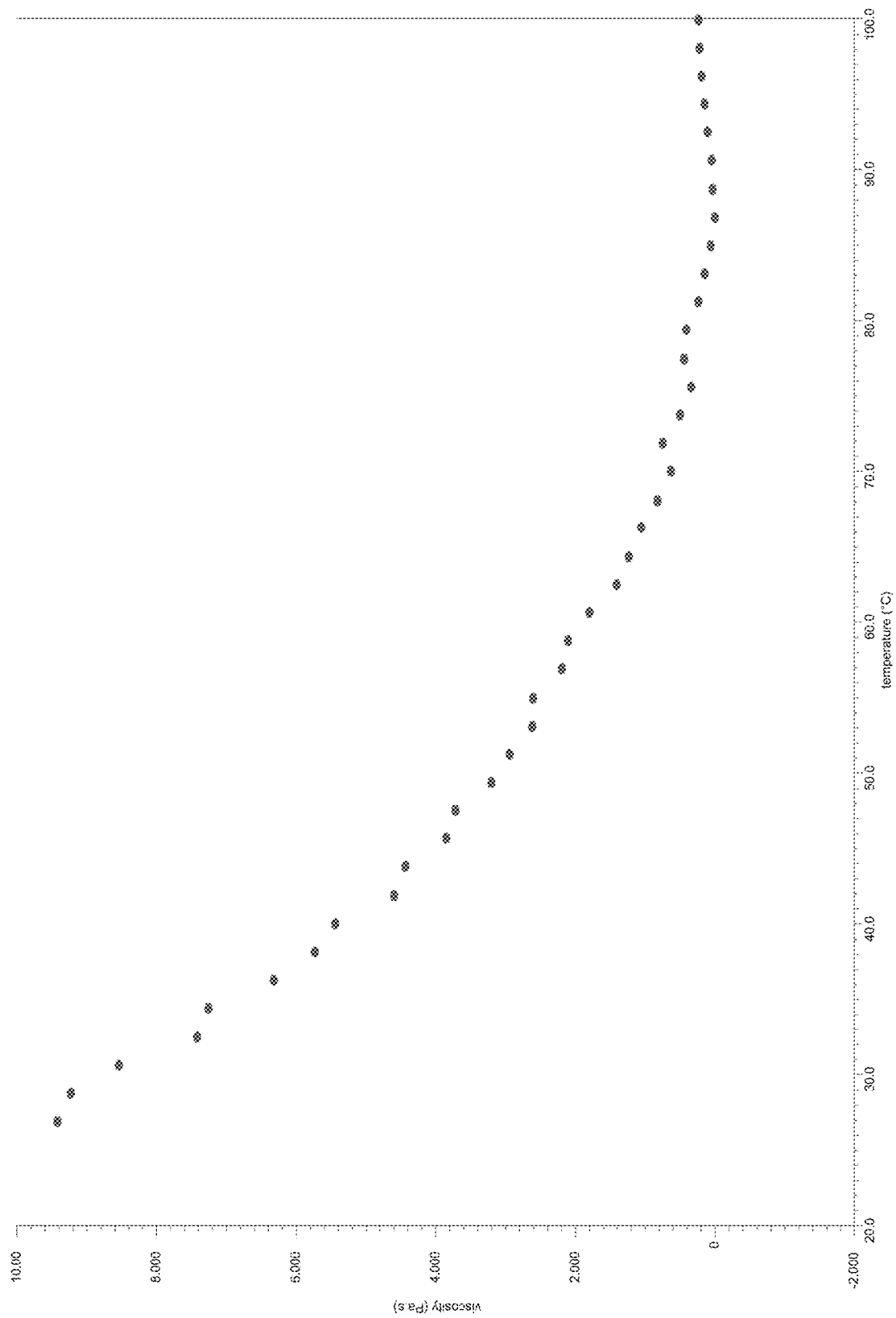
FIG. 1 is a plot of the melt viscosity (Pa·s) versus temperature for Example 3 of the invention.
Figure 2:
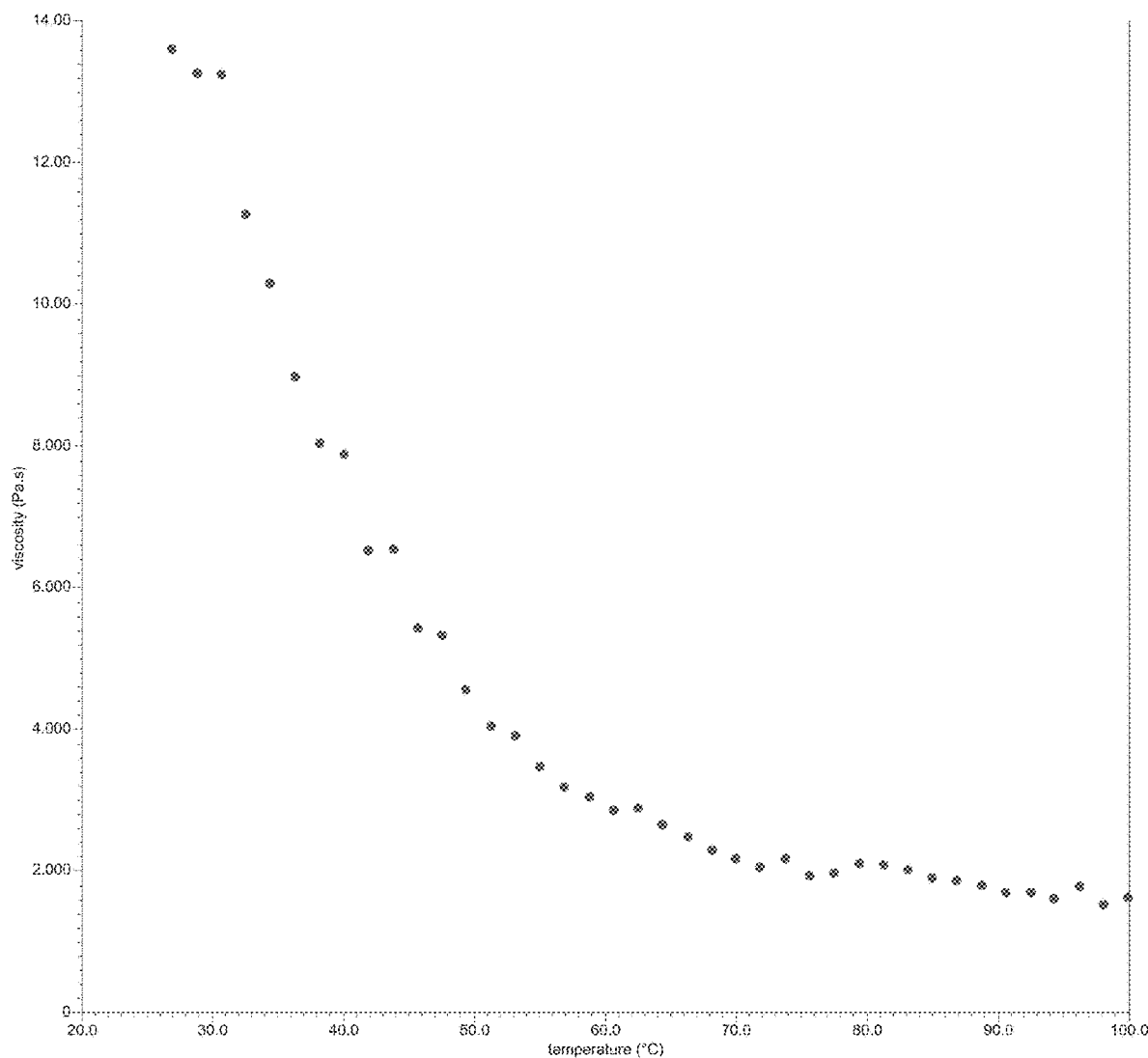
FIG. 2 is a plot of the melt viscosity (Pa·s) versus temperature for Example 5 of the invention.
Figure 3:
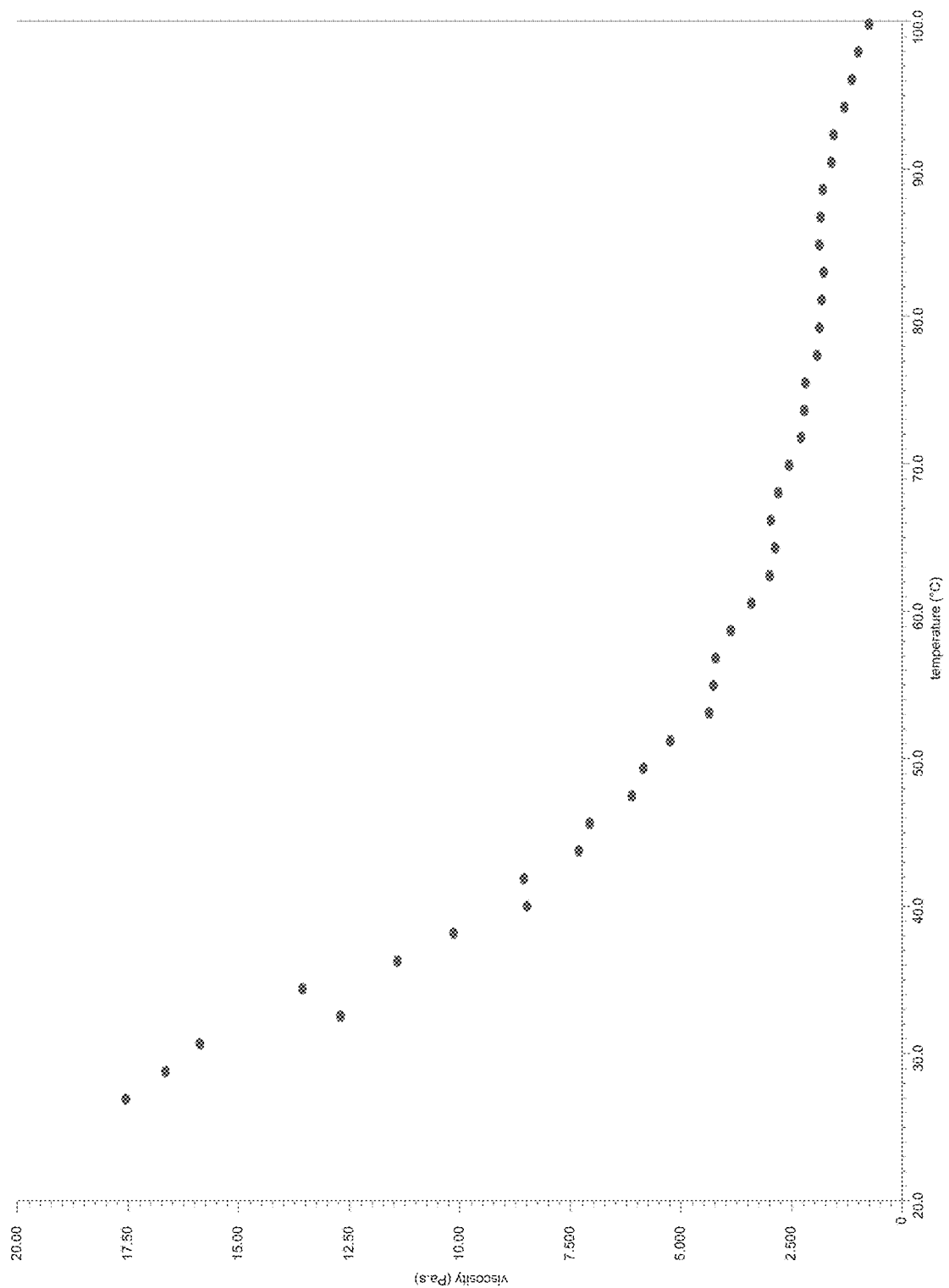
FIG. 3 is a plot of the melt viscosity (Pa·s) versus temperature for Example 6 of the invention.
Figure 4:
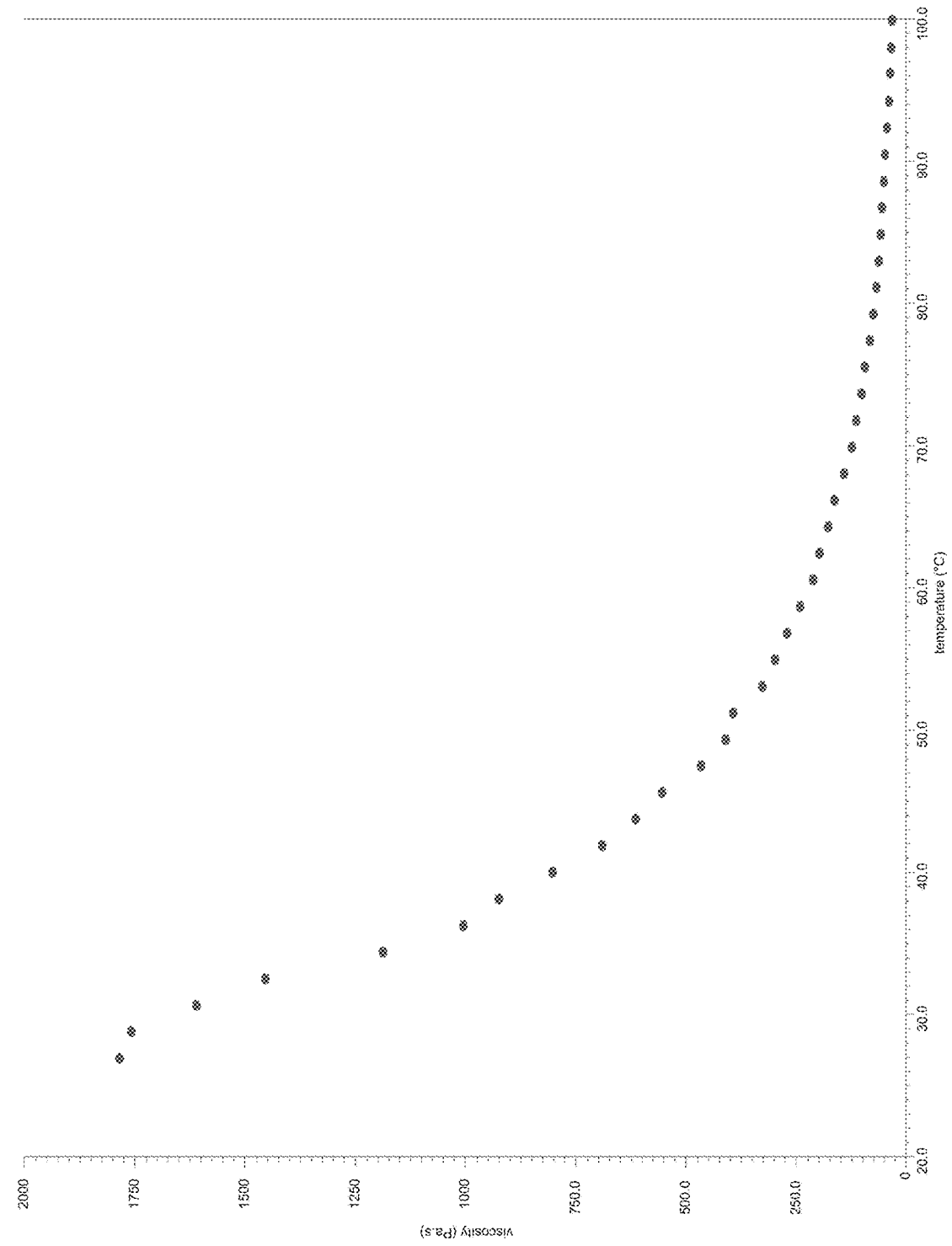
FIG. 4 is a plot of the melt viscosity (Pa·s) versus temperature for Example 8 of the invention.
Figure 5:
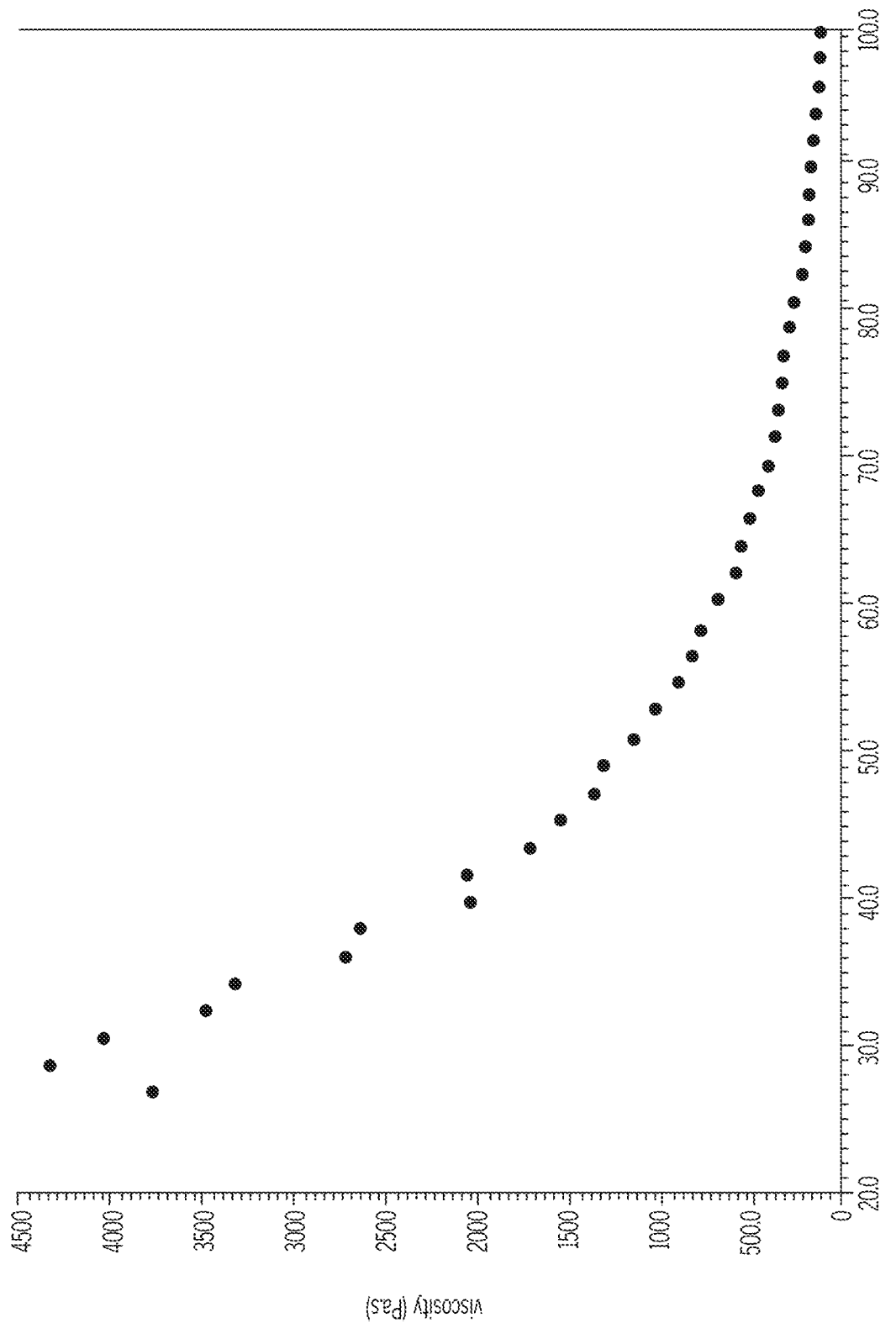
FIG. 5 is a plot of the melt viscosity (Pa·s) versus temperature for Comparative Example 10 of the invention.
Figure 6:
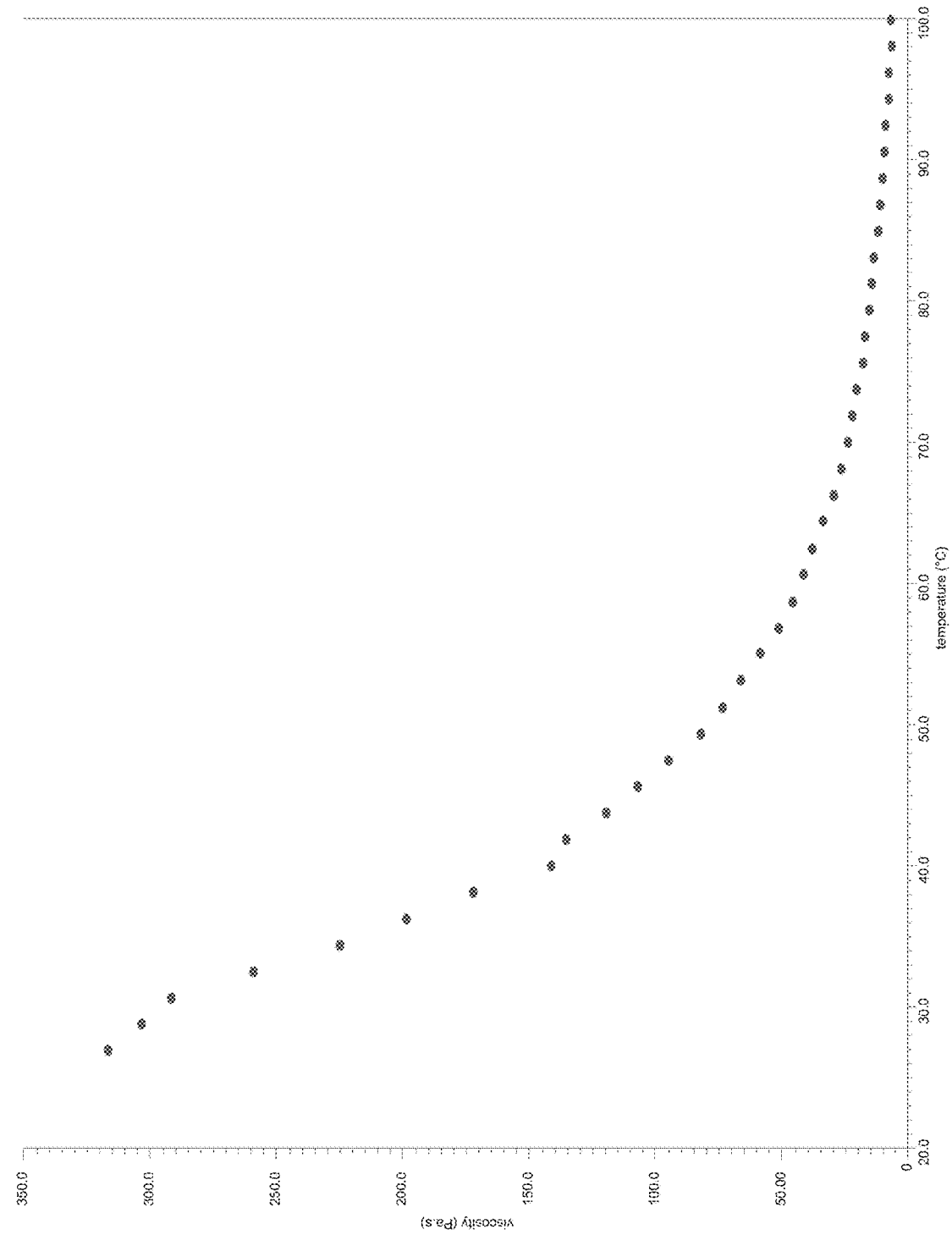
FIG. 6 is a plot of the melt viscosity (Pa·s) versus temperature for Comparative Example 12 of the invention.

Acrylic copolymers prepared by sequential polymerization of polymer segments from different monomers are provided. The copolymer contains at least one non-reactive segment and at least one reactive segment. The reactive segment includes at least one functional group that is capable of undergoing a crosslinking reaction. The polymer segments have controlled size and placement for tailored properties. For example, by selectively placing functional groups in desirable positions on a polymer molecule, polymers that yield pressure sensitive adhesives that exhibit enhanced balance between cohesion and adhesion can be produced.

High modulus elastomers and high strength adhesives typically display a constant modulus as a function of temperature. Conversely, highly extensible, tough elastomers, and high tack and peel adhesives often have a degree of viscous liquid character. One route to this behavior is through control of cross-link density via placement of reactive functionalities in specific segments of the polymer. Placing reactive functionalities in segments adjacent to the polymer end groups yields high modulus high strength. Placing the reactive functionalities in the central segment(s) of the polymer yields significant viscous liquid character.

The present invention provides, in one embodiment, a two-step polymerization process for making a crosslinkable acrylic copolymer having a first segment with reactive functional groups provided by at least one acrylic monomer. A second segment is added to the first segment to form the acrylic copolymer. The second segment does not contain crosslinkable functional groups and is miscible with the first segment. As used herein, the term "molecularly miscible" means a compound or mixture of compounds that exhibit properties in the bulk state that are indicative of single phase behavior. With respect to the acrylic copolymer, the observation of a single Tg is indicative of polymer segment miscibility. The single Tg is intermediate between those of the constituent polymer segments and varies monotonically between these values as the relative amounts of each segment changes.

In an alternative embodiment, there is provided a process for making a crosslinkable acrylic copolymer having a first segment having no reactive functional groups, wherein a second segment having reactive functional groups provided by at least one acrylic monomer is added to the first segment to form the acrylic copolymer.

With conventional free-radical polymerization, polymers are terminated when the reactive free-radical end group is destroyed via termination or chain transfer reactions. The termination and chain transfer processes are typically irreversible and yield a polymer that is inactive. The result of this is a broad molecular weight distribution and little control over the distribution of monomers in the polymer backbone. Controlled radical polymerizations involve reversible radical processes in which irreversible termination and chain transfer are largely absent. There are three main types of controlled radical polymerization methodologies including atom transfer radical polymerization (ATRP), reversible addition-fragmentation chain transfer (RAFT), and stable free radical polymerization (SFRP) (of which nitroxide mediated polymerization (NMP) is a subset). RAFT and SFRP are particularly useful methods because of their tolerance to a wide array of functional groups and their efficiency and versatility in producing controlled radical polymerized polymers.

In one embodiment of the invention there is provided a crosslinkable composition comprising: at least one acrylic copolymer comprising at least one reactive segment of controlled size and position and at least one non-reactive segment of controlled size and position, the reactive segment comprising at least one monomer having at least one reactive functional group capable of undergoing a crosslinking reaction, wherein the functional group is in a non-terminal position in the copolymer, the non-reactive segment being non-reactive with the reactive functional group of the reactive segment, wherein the reactive segment and the non-reactive segment are molecularly miscible before cure. The nonreactive segment may contain a group that is capable of undergoing crosslinking while remaining nonreactive with the reactive segment.

The non-reactive segment of the acrylic polymer may be derived from acrylates, methacrylates, or mixtures thereof. The acrylates include $C_1$ to about $C_{20}$ alkyl, aryl or cyclic acrylates such as methyl acrylate, ethyl acrylate, phenyl acrylate, butyl acrylate, 2-ethylhexyl acrylate, n-hexyl acrylate, n-heptyl acrylate, n-octyl acrylate, n-nonyl acrylate, isobornyl acrylate, 2-propyl heptyl acrylate, isodecyl acrylate, isostearyl acrylate and the like. These compounds typically contain from about 3 to about 20 carbon atoms, and in one embodiment about 3 to about 8 carbon atoms. The methacrylates include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, isooctyl methacrylate, and the like. These compounds typically contain from about 4 to about 20 carbon atoms, and in one embodiment about 3 to about 10 carbon atoms.

The reactive segment of the acrylic polymer may be a copolymer derived from one or more of the monomers of the non-reactive segment and at least one polymerizable comonomer having crosslinkable functionality. In one embodiment, the reactive segment comprises at least one monomer having the formula:

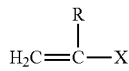
(I)

where R is H or $CH_3$ and X represents or contains a functional group capable of crosslinking. The crosslinkable functional group of the reactive segment of the acrylic polymer is not particularly restricted, but may include one or more crosslinkable silyl, hydroxyl, carboxyl, carbonyl, carbonate ester, isocyanato, epoxy, vinyl, amino, amide, imide, anhydride, mercapto, acid, acrylamide and acetoacetyl groups.

Hydroxy functional monomers include, for example, hydroxy ethyl (meth)acrylate, hydroxy isopropyl (meth)acylate, hydroxy butyl (meth)acrylate and the like. Epoxy functional monomers include, for example, glycidyl methacrylate and glycidal acrylate.

The acid containing monomers include unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like. Anhydride containing monomers include maleic anhydride, itaconic anhydride, citraconic anhydride and the like.

The acrylamides include acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

The polymerizable silanes include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl)methyldimethoxysilane, (methacryloxymethyl)methyldiethoxysilane, γ-methacryloxypropyltriacetoxysilane, γ-acryloxypropyltrimethoxy-silane, γ-acryloxypropyltriethoxysilane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-acryloxypropyl-methyldipropoxysilane, and the like.

In addition to the monomer having functional group(s), the reactive segment may include at least one monomer having the formula:

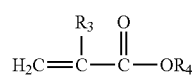
(II)

where $R_3$ is H or $CH_3$ and $R_4$ is a branched or unbranched, saturated alkyl group having 4 to 14 carbon atoms.

The acrylic copolymers of the invention are prepared using any of the controlled radical polymerization processes, which include atom-transfer radical polymerization (ATRP); rapid addition-fragmentation chain transfer (RAFT); and stable free radical polymerization (SFRP). Nitroxide-mediated polymerization (NMP) is an example of an SFRP process.

ATRP involves the chain initiation of free radical polymerization by a halogenated organic species in the presence of a metal halide species. The metal has a number of different oxidation states that allows it to abstract a halide from the organohalide, creating a radical that then starts free radical polymerization. After initiation and propagation, the radical on the chain active chain terminus is reversibly terminated (with the halide) by reacting with the catalyst in its higher oxidation state. A simplified mechanism for reversible activation-deactivation of polymer chains during ATRP is shown in Scheme 1. Thus the redox process gives rise to an equilibrium between dormant (polymer-halide) and active (polymer-radical) chains. The equilibrium is designed to heavily favor the dormant state, which effectively reduces the radical concentration to sufficiently low levels to limit bimolecular coupling.

The initiator in ATRP is usually a low molecular weight activated organic halide (RX, R=activated alkyl, X=chlorine, bromine, iodine). However, organic pseudohalides (e.g., X=thiocyanate, azide) and compounds with weak N—X (e.g., N-bromosuccinimide) or S—X (e.g., sulfonyl halides) may be used. ATRP can be mediated by a variety of metals, including Ti, Mo, Re, Fe, Ru, Os, Rh, Co, Ni, Pd and Cu. Complexes of Cu offer the most efficient catalysts in the ATRP of a broad range of monomer in diverse media. Commonly used nitrogen-based ligands used in conjunction with Cu ATRP catalysts include derivatives of bidentate bipyridine and pyridine imine, tridentate diethylenetriamine and tetradentate tris[2-aminoethylene]amine and tetraazacyclotetradecane.

Scheme 1

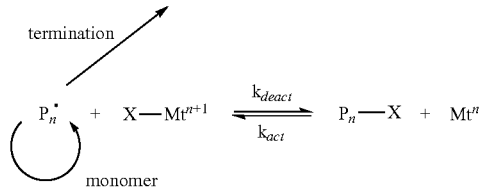

Controlled polymerization by RAFT occurs via rapid chain transfer between growing polymer radicals and dormant polymer chains. After initiation, the control agent becomes part of the dormant polymer chain. The key mechanistic features of RAFT are illustrated in Scheme 2. Common RAFT agents contain thiocarbonyl-thio groups, and include, for example, dithioesters, dithiocarbamates, trithiocarbonates and xanthenes. Examples of useful RAFT agents include those described in "The Chemistry of Radical Polymerization", Graeme Moad & David H. Solomon, 2$^{nd}$ rev. ed., 2006, Elsevier, p. 508-514, which is incorporated by reference herein.

Initiation and radical-radical termination occur as in conventional radical polymerization. In the early stages of the polymerization, addition of a propagating radical (Pn˙) to the thiocarbonylthio compound followed by fragmentation of the intermediate radical gives rise to a polymeric thiocarbonylthio compound and a new radical (R˙). Reaction of the radical (R˙) with monomer forms a new propagating radical (Pm˙). A rapid equilibrium between the active propagating radicals (Pn˙ and Pm˙) and the dormant polymeric thiocarbonylthio compounds provides equal probability for all chains to grow and allows for the production of narrow dispersity polymers.

Moad & David H. Solomon, 2$^{nd}$ rev. ed., 2006, Elsevier, p. 473-475, which is incorporated by reference herein. An example of a commercially available NMP agent is BlocBuilder®, an alkoxyamine compound that acts an initiator and control agent, available from Arkema.

Crosslinking Agent

The adhesive may be crosslinked during post curing of the adhesive to increase the cohesive strength of the pressure sensitive adhesive. This can be achieved via covalent crosslinking such as heat, actinic or electron beam radiation, or metal based ionic crosslinking between functional groups. Table 1 below lists the types of crosslinkers for the various functional groups of the segmented polymer.

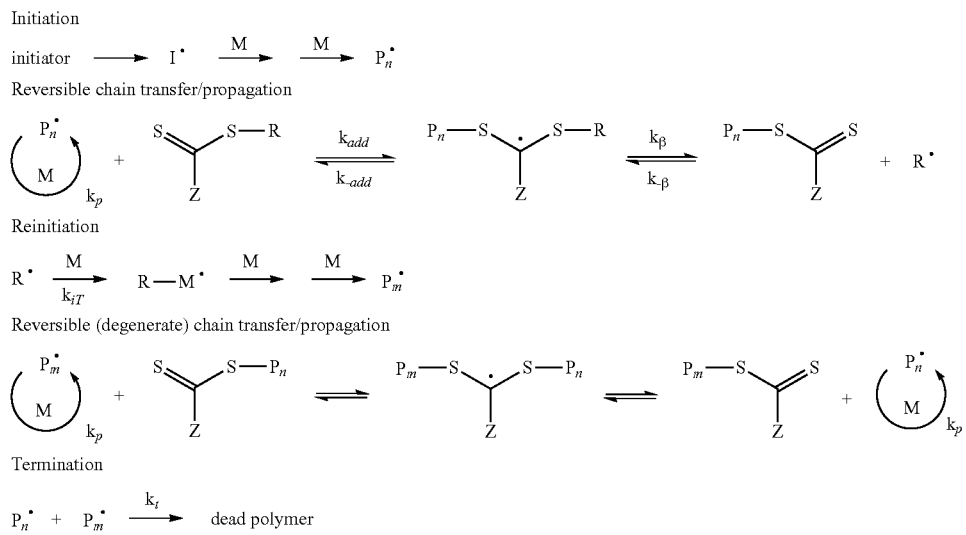

Scheme 2

SFRP, and in particular, NMP achieves control with dynamic equilibrium between dormant alkoxyamines and actively propagating radicals. The use of nitroxides to mediate (i.e., control) free radical polymerization has been developed extensively. Many different types of nitroxides have been described and there are many methods for producing nitroxides in-situ. Regardless of the nitroxide or its method of generation, the key mechanistic feature of NMP is reversible coupling of the nitroxide (i.e., R2NO) to a growing polymer chain radical (P˙) as shown in Scheme 3.

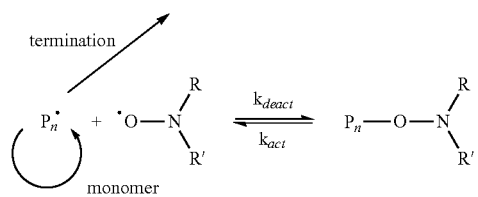

Scheme 3

Examples of useful NMP agents include those described in "The Chemistry of Radical Polymerization", Graeme

TABLE 1

| Functional Group of Segmented Polymer | Crosslinker |
|---|---|
| Silane | Self-reactive |
| Hydroxyl | Isocyanate, Melamine Formaldehyde, Anhydride, Epoxy, Titanium esters and Chelates |
| Carboxylic acid, phosphoric acid | Aziridines, Isocyanate, Melamine Formaldehyde, Anhydride, Epoxy, Carboiimides, Metal Chelates, Titanium esters and Oxazolines |
| Isocyanate | Self-reactive, Carboxylic acid, Amine, Hydroxyl |
| Vinyl | Addition reaction with Silicone hydride |
| (Meth)acrylate | Amine, Mercaptan, Self-reactive with radical catalyst (UV, Thermal), Acetoacetate |
| Epoxy | Amine, Carboxylic acid, Phosphoric acid, Hydroxyl, Mercaptan |
| Amine | Isocyanate, Melamine formaldehyde, anhydride, epoxy, acetoacetate |
| Mercapto | Isocyanate, Melamine formaldehyde, Anhydride, Epoxy |
| Acetoacetate | Acrylate, Amine |

Suitable polyfunctional aziridines include, for example, trimethylolpropane tris[3-aziridinylpropionate]; trimethylolpropane tris[3-(2-methylaziridinyl) propionate]; trimethylolpropane tris[2-aziridinylbutyrate]; tris(1-aziridinyl)-phosphine oxide; tris(2-methyl-1-aziridinyl)phosphine oxide; penta-erythritoltris[3-(1-aziridinyl)propionate]; and pentaerythritol tetrakis[3-(1-aziridinyl)propionate]. Combinations of more than one polyfunctional aziridine may also be used. Examples of commercially available polyfunctional aziridines include NEOCRYL CX-100 from Zeneca Resins, believed to be trimethylolpropaten tris[3-(2-methylaziridinyl)-propanoate], and Xama-2, Xama-7 and Xama-220 from Bayer Material Science.

Multifunctional aziridine amides which have the general formula:

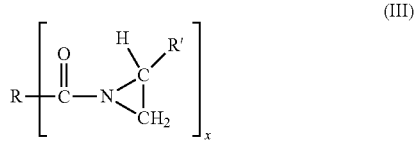

(III)

wherein R can be either an alkylene or aromatic group and R' can be a hydrogen or alkyl group and x is at least 2 may be used. Examples of suitable multifunctional aziridine amides include 1,1'-(1,3-phenylenedicarbonyl)bis[2-methyl aziridine]; 2,2,4-trimethyladipoyl bis [2-ethyl aziridine]; 1,1'-azelaoyl bis [2-methyl aziridine]; and 2,4,6-tris(2-ethyl-1-aziridinyl)-1,3,5 triazine.

Metal chelate crosslinking agents may be compounds prepared by coordinating multivalent metals such as Al, Fe, Zn, Sn, Ti, Sb, Mg and V with acethylacetone or ethyl acetoacetonate.

Among the isocyanate crosslinking agents that can be used are aromatic, aliphatic and cycloaliphatic diisocyanates and triisocyanates. Examples include 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,6-hexamethylene diisocyanate, 1,10-decamethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyante, 1,2,4-benzene diisocyanate, isoform diisocyanate, 1,4-tetramethylxylene diisocyanate, 1,5-naphthalene diisocyanate, or their reactants with polyol such as trimethylolpropane.

Other useful crosslinking agents include monomeric and polymeric melamine crosslinkers, such as Cymel 303 and 370 available from Cytec.

The crosslinking agent is typically used at a level from about 0.05% to about 5%, or from about 0.075% to about 2%, or from about 0.1% to about 1.5% by weight of adhesive solids.

Anhydride functional segmented polymers may be converted to silanes via a post polymerization reaction with amino-, mercapto- or hydroxyl-functional silanes. Examples of amino group-containing alkoxysilanes having a primary amino group alone as a reactive group include aminoalkyltrialkoxysilanes such as aminomethyltrimethoxysilane, aminomethyltriethoxysilane, β-aminoethyltrimethoxysilane, β-aminoethyltriethoxysilane, γ-aminopropyltrimeth-oxysilane, γ-aminopropyltriethoxysilane, γ-aminopropyltripropoxysilane, γ-aminopropyltriisopropoxysilane, and γ-aminopropyltributoxysilane; (aminoalkyl)-alkyldialkoxysilanes such as β-aminoethylmethyldimethoxysilane, γ-amino-ethylmethyldiethoxysilane, γ-aminopropylmethyldimethoxysilane, γ-aminopropyl-methyldiethoxysilane, and γ-aminopropylmethyldipropoxysilane; and corresponding aminoalkyldialkyl(mono)alkoxysilanes.

Examples of amino group-containing alkoxysilanes having a primary amino group and a secondary amino group as reactive groups include N-(aminoalkyl)aminoalkyltrialkoxysilanes such as N-β-(aminoethyl)-γ-aminopropyltrimethoxysilane and N-β-(aminoethyl)-γ-aminopropyltriethoxysilane; and N-(aminoalkyl)aminoalkylalkyldialkoxysilanes such as N-β-(aminoethyl)-γ-amino-propylmethyldimethoxysilane and N-β-(aminoethyl)-γ-aminopropylmethyldiethoxysilane.

Examples of amino group-containing alkoxysilanes having a secondary amino group alone as a reactive group include N-phenylamino-methyltrimethoxysilane and N-phenyl-β-aminoethyltrialkoxysilanes such as N-phenyl-β-aminoethyltrimethoxysilane and N-phenyl-β-aminoethyltriethoxysilane; N-phenyl-γ-aminopropyltrialkoxysilanes such as N-phenyl-γ-aminopropyltrimethoxysilane, N-phenyl-γ-aminopropyltriethoxysilane, N-phenyl-γ-aminopropyltripropoxysilane, and N-phenyl-γ-aminopropyltributoxysilane; corresponding N-phenylaminoalkyl(mono- or di-)alkyl (di- or mono-)alkoxysilanes; as well as N-alkylaminoalkyltrialkoxysilanes corresponding to the above-listed amino group-containing alkoxysilanes having a secondary amino group substituted with phenyl group, such as N-methyl-3-aminopropyltrimethoxysilane, N-ethyl-3-aminopropyltrimethoxysilane, N-n-propyl-3-aminopropyltrimethoxysilane, N-n-butyl-aminomethyltrimethoxysilane, N-n-butyl-2-aminoethyltrimethoxysilane, N-n-butyl-3-aminopropyltrimethoxysilane, N-n-butyl-3-aminopropyltriethoxysilane, and N-n-butyl-3-aminopropyltripropoxysilane, and corresponding N-alkylaminoalkyl(mono- or di-) alkyl(di- or mono)alkoxysilanes. Others include N-cyclohexylaminomethylmethyldiethoxy silane and N-cyclohexylaminomethyl-triethoxysilane.

Examples of the mercapto group-containing silanes include mercaptoalkyltrialkoxysilanes such as mercaptomethyltrimethoxysilane, mercaptomethyltriethoxysilane, β-mercaptoethyltrimethoxysilane, β-mercapto-ethyltriethoxysilane, β-mercaptoethyltripropoxysilane, β-mercaptoethyl-triisopropoxysilane, β-mercaptoethyltributoxysilane, γ-mercaptopropyl-trimethoxysilane, γ-mercaptopropyltriethoxysilane, γ-mercaptopropyltri-propoxysilane, γ-mercaptopropyltriisopropoxysilane, and γ-mercapto-propyltributoxysilane; (mercaptoalkyl)alkyldialkoxysilanes such as β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane, β-mercaptopropylmethyldiisopropoxy-silane, γ-mercaptopropylmethyldibutoxysilane, β-mercaptopropylmethyldibutoxysilane, γ-mercaptopropylethyldimethoxy-silane, γ-mercaptopropylethyldiethoxysilane, γ-mercaptopropylethyldipropoxy-silane, γ-mercaptopropylethyldiisopropoxysilane, and γ-mercaptopropyl-ethyldibutoxysilane; and corresponding (mercaptoalkyl)dialkyl(mono)-alkoxysilanes.

Examples of hydroxyl-functional silanes include hydroxymethyltrialkoxy silanes having the formula:

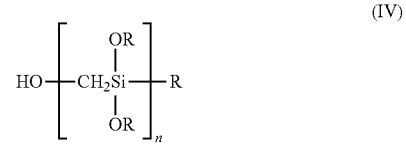

(IV)

Where R is an alkyl group and n is at least 1. The alkyl group is preferably a lower alkyl group having 1 to 6 carbon atoms, and preferably 1 to 3 carbon atoms. Particularly useful are the silanes in which the alkyl group is methyl or ethyl, namely hydroxymethyltriethoxysilane and hydroxymethyltriethoxysilane when n is formula III is equal to 1.

The adhesives of the present invention may further comprise additives such as pigments, fillers, plasticizer, diluents, antioxidants, tackifiers and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, christobalite, glass fibers, kaolin, precipitated or fumed silica, copper, quartz, wollasonite, mica, magnesium hydroxide, silicates (e.g. feldspar), talc, nickel and calcium carbonate are also useful. Metal oxides such as aluminum trihydrate and magnesium hydroxide are particularly useful as flame retardants.

A wide variety of tackifiers can be used to enhance the tack and peel of the adhesive. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$, $C_5$, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present invention. Various mixed aliphatic and aromatic resins, such as Hercotex AD 1100, manufactured and sold by Hercules Corporation, can be used.

While the resins described above are quite useful for tackifying the copolymers of the instant invention, the particular tackifying resin and/or amount selected for a given formulation may depend upon the type of acrylic polymer being tackified. Many resins which are known in the prior art as being useful for tackifying acrylic based pressure sensitive adhesives can be effectively used in the practice of the present invention, although the scope of the invention is not limited to only such resins. Resins described in Satas, Handbook of Pressure Sensitive Adhesive Technology, Von Nostrand Reinhold, Co, Chap. 20, pages 527-584 (1989) (incorporated by reference herein) could be used.

The amount of tackifier used in the present invention is dependent upon the type of copolymer and tackifier used. Typically, pressure-sensitive adhesive compositions prepared in accordance with the present invention will comprise from 5 to about 60% by weight total of one or more tackifiers.

In one embodiment, the tackifier has a ring and ball softening point of from about 100° C. to about 150° C. In one embodiment, the tackifier comprises a terpene phenolic tackifier having a ring and ball softening point of from about 110° C. to about 120° C.

In another embodiment, the added resin may serve a dual purpose. For example, a resin such as Wingstay L®, a butylated reaction product of para-cresol and dicyclopentadiene with an average molecular weight of 650 produced by Eliokem, can serve both as a tackifier and an antioxidant.

In one embodiment, a low molecular weight polymeric additive is incorporated into the adhesive composition. The polymeric additive is polymerized from monomers selected from $C_1$-$C_{20}$ alkyl and cycloalkyl acrylates, $C_1$-$C_{20}$ alkyl and cycloalkyl methacrylates, free-radical polymerizable olefinic acids, and optionally other ethylenically unsaturated monomers. Suitable alkyl and cycloalkyl acrylates include the various esters of acrylic acid such as methyl acrylate, ethyl acrylate, n-propyl acrylate, isopropyl acrylate, n-butyl acrylate, isobutyl acrylate, t-butyl acrylate, isobornyl acrylate, pentyl acrylate, hexyl acrylate, octyl acrylate, iso-octyl acrylate, nonyl acrylate, lauryl acrylate, stearyl acrylate, eicosyl acrylate, 2-ethylhexyl acrylate, cyclohexyl acrylate, cycloheptyl acrylate, and the like and mixtures thereof. Suitable alkyl and cycloalkyl methacrylate include the esters of methacrylic acid such as methyl methacrylate, ethyl methacrylate, propyl methacrylate, n-butyl methacrylate, t-butyl methacrylate, isobutyl methacrylate, pentyl methacrylate, hexyl methacrylate, cyclohexyl methacrylate, 2-ethylhexyl methacrylate, isobornyl methacrylate, heptyl methacrylate, cycloheptyl methacrylate, octyl methacrylate, iso-octyl methacrylate, nonyl methacrylate, decyl methacrylate, lauryl methacrylate, eicosyl methacrylate and the like and mixtures thereof. Suitable free-radical polymerizable olefinic acids include acrylic acid, methacrylic acid, fumaric acid, crotonic acid, itaconic acid, 2-acryloxypropionic acid, and the like and mixtures thereof.

Various amounts of other ethylenically-unsaturated monomers can optionally be used provided that the polymeric additive has a softening point greater than about 40° C. and a number average molecular weight less than about 35,000. Optional ethylenically-unsaturated monomers suitable for use in the polymeric additive include, for example, styrene, alpha-methyl styrene, vinyl toluene, acrylonitrile, methacrylonitrile, ethylene, vinyl acetate, vinyl chloride, vinylidene chloride, acrylamide, methacrylamide 2-cyanoethyl acrylate, 2-cyanoethyl methacrylate, dimethylaminoethyl methacrylate, dimethylaminopropyl methacrylate t-butylaminoethyl methacrylate, glycidyl acrylate, glycidyl methacrylate, benzyl acrylate, benzyl methacrylate, phenyl acrylate, phenyl methacrylate and the like. The amount of the polymeric additive used may be in the range of about 1% to about 55% by weight, based on the total weight of the adhesive composition. Such low molecular weight additives as described in U.S. Pat. No. 4,912,169, the disclosure of which is hereby incorporated by reference.

The polymerization catalyst can be, for example, organic tin compounds, metal complexes, amine compounds and other basic compounds, organic phosphate compounds, and organic acids. Examples of the organic tin compounds include dibutyltin dilaurate, dibutyltin maleate, dibutyltin phthalate, stannous octoate, dibutyltin methoxide, dibutyltin diacetylacetate and dibutyltin diversatate. Examples of metal complexes are titanate compounds such as tetrabutyl titanate, tetraisopropyl titanate, and tetraethanolamine titanate; metal salts of carboxylic acids, such as lead octoate, lead naphthoate, and cobalt naphthoate; and metal acetylacetonate complexes such as aluminum acetylacetonate complex and vanadium acetylacetonate complex. The amine compounds and other basic compounds include, for example aminisilanes such as γ-aminopropyl trimethoxysilane and γ-aminopropyltriethoxysilane; quaternary ammonium salts such as tetramethylammonium chloride and benzalkonium chloride; and straight-chain or cyclic tertiary amines or quaternary ammonium salts each containing plural nitrogen atoms. The organic phosphate compounds include monomethyl phosphate, di-n-butyl phosphate and triphenyl phosphate. Examples of organic acid catalysts include alkyl sulfonic acids such as methane sulfonic acid, aryl sulfonic acids such as p-toluene sulfonic acid, benzene sulfonic acid, styrene sulfonic acid and the like.

EXAMPLES

The following test methods were used for evaluating the adhesive properties of the acrylic adhesives.

| PSA PERFORMANCE TEST METHODS | |
|---|---|
| Test | Condition |
| 180° Peel | a, b |
| 15 Minute Dwell | |
| 24 Hour Dwell | |
| 72 Hour Dwell | |
| Shear Strength | c |
| Shear Adhesion Failure Temp. (SAFT) | d |

(a) Peel, sample applied to a stainless steel panel with a 5 pound roller with 1 pass in each direction. Samples conditioned and tested at 23° C.
(b) Peel, sample applied to a high density polyethylene with a 5 pound roller with 5 passes in each direction. Samples conditioned and tested at 23° C.
(c) Shear: 1 kg weight with a 1/2 inch by 1 inch overlap. Sample applied to a stainless steel panel with a 10 pound roller with 5 passes in each direction. Samples conditioned and tested at 23° C.
(d) SAFT: 1000 gram weight, 1 inch by 1 inch overlap (2.2 pounds/square inch). Sample applied to a stainless steel panel with a 10 pound roller with 5 passes in each direction. Samples conditioned for 1 hour at 23° C. and 15 minutes at 40° C. Temperature increased by 0.5° C./min.until failure.

Melt Viscosity Vs. Temperature:

A Buchi Rotavap R-200 is used to yield a solvent free copolymer by heating the copolymer to 65° C. and by pulling a vacuum to <25 mbars. Meltflow viscosity is measured on a TA Instrument AR 1000 rheometer configured with a cone and plate clamp. This experiment is performed with a temperature sweep starting at 25° C. and finishing at 99.8° C. The Temperature ramp rate is set to a constant 1° C./minute and a shear rate (1/s) of 0.02864. The test is designated to sample 40 points from beginning to end. Once the settings are established and calibrated, a quarter sized-amount of solvent free adhesive is placed onto the plate, centered directly under the cone adapter of the AR 1000. The cone is then lowered onto the adhesive down to a gap of 1500 mm. All remaining adhesive that is outside the testing area is removed and then the test is able to begin. FIGS. 1-6 are graphs of the melt viscosity vs temperature for Examples 3, 5, 6, 8 and Comparative Examples 10 and 12, respectively. (1 Pa·s=1,000 centi-poise.)

The invention is further described by reference to the following non-limiting examples.

Example 1: Preparation of Segmented Acrylic Polymer Having Acrylamide Functionality Using RAFT Agent An acrylic copolymer with reactive functionalities positioned in the segment adjacent to the polymer chain ends is prepared as follows. Into a 500 ml equipped with a heating jacket, agitator, reflux condenser, feed tanks and nitrogen gas inlet there is charged 15.0 g of ethyl acetate. Monomers and RAFT agent are added in the following amounts to generate the segment adjacent to the polymer chain ends.

23.32 g butyl acrylate
3.36 g of isobutoxymethyl acrylamide
1.55 g of dibenzyl trithiocarbonate (RAFT agent)

The reactor charge is heated to reflux conditions (reactor jacket 85° C.) with a constant nitrogen purge. Once solvent reflux is attained, an initiator solution of 0.146 g 2,2'-azo-bis(isobutyronitrile) (AIBN, Vazo-64) and 5.0 g acetone is added to the reactor. After a peak temperature of 80-85° C. is reached, the reaction conditions are maintained for 30 minutes at which point >80% of the monomers are consumed to generate the reactive segment of a theoretical Mn of 5000 g/mole. A reagent feed mixture with an active nitrogen purge of 102.51 g ethyl acetate, 11.39 g acetone, 373.33 g butyl acrylate, and 0.03 g Vazo-64 is added over a period of two hours to the reactor. Over the two hour reagent feed the temperature of the reaction is held at 79-81° C. The reaction conditions are maintained for 3 hours after completion of the reagent feed at which point >97.0% of the monomers are consumed to generate a nonreactive segment of theoretical Mn of 70000 g/mole. The resulting solution polymer is then cooled to ambient temperature and discharged from the reactor.

The resulting acrylic polymer contains 99.16% butyl acrylate, and 0.84% isobutoxymethyl acrylamide based on 100% by weight of the acrylic polymer. The measured molecular weight (Mn) of the acrylic polymer is 62200 (determined by gel permeation chromatography relative to polystyrene standards) and the polydispersity is 1.3.

Methane sulfonic acid in an amount of 0.1% based on solids is added to the acrylic polymer. The adhesive composition is dried at 130° C. for 15 minutes to ensure complete cross-linking of the acrylic polymer.

Comparative Example 2: Preparation of Random Acrylic Copolymer Having Acrylamide Functionality An acrylic copolymer with reactive functionality distributed throughout the entire polymer is prepared as follows. Into a 500 ml equipped with a heating jacket, agitator, reflux condenser, feed tanks and nitrogen gas inlet there is charged 15.0 g of ethyl acetate. Monomers and RAFT agent are added in the following amounts:

23.32 g butyl acrylate
0.22 g of isobutoxymethyl acrylamide
1.55 g of dibenzyl trithiocarbonate (RAFT agent)

The reactor charge is heated to reflux conditions (reactor jacket 85° C.) with a constant nitrogen purge. Once solvent reflux is attained, an initiator solution of 0.146 g 2,2'-azo-bis(isobutyronitrile) (AIBN, Vazo-64) and 5.0 g acetone is added to the reactor. After a peak temperature of 80-85° C. is reached, the reaction conditions are maintained for 30 minutes. A reagent feed mixture with an active nitrogen purge of 102.51 g ethyl acetate, 11.39 g acetone, 373.33 g butyl acrylate, 3.14 g isobutoxymethyl acrylamide and 0.03 g Vazo-64 is added over a period of two hours to the reactor. Over the two hour reagent feed the temperature of the reaction is held at 79-81° C. The reaction conditions are maintained for 3 hours after completion of the reagent feed. The resulting solution polymer is then cooled to ambient temperature and discharged from the reactor.

The resulting acrylic polymer contains 99.16% butyl acrylate, and 0.84% isobutoxymethyl acrylamide based on 100% by weight of the acrylic polymer. The measured molecular weight (Mn) of the acrylic polymer is 62200 (determined by gel permeation chromatography relative to polystyrene standards) and the polydispersity is 1.3.

Methane sulfonic acid in an amount of 0.1% based on solids was added to the acrylic polymer. The adhesive composition is dried at 130° C. for 15 minutes to ensure complete cross-linking of the acrylic polymer.

Test Results

The adhesives of Example 1 and Comparative Example 2 are coated onto 2-mil polyethylene terephthalate at 58-62 grams per square meter (gsm) and dried at 130° C. for 15 minutes. The test results appear in Table 3 below.

Example 3: Preparation of Segmented Acrylic Polymer Having Acid Functionality Using SFRP Agent An acrylic copolymer with reactive functionalities positioned in the segment adjacent to the polymer chain ends is prepared as follows. Into a 2000 ml reactor equipped with a heating jacket, agitator, reflux condenser, feed tanks and nitrogen gas inlet there is charged 302.33 g of butyl acetate. Monomers and SFRP agent are added in the following amounts to generate a portion of the non-reactive segment at the center of the polymer chain of the reactive polymer mode.

298.24 g of n-Hexyl Acrylate
15.96 g of BlocBuilder® functionalized 1,3-butanediol diacrylate (SFRP agent)

The reactor charge is heated to greater than 65° C. (reactor jacket 70° C.) with a constant nitrogen purge and held for 30 minutes. After the hold, the reactor charge mixture is heated to 120° C. (reactor jacket 130° C.). After a peak temperature of 120-125° C. is reached, the reaction conditions are maintained for 30 minutes. A reagent feed mixture with an active nitrogen purge of 129.49 g ethyl acetate and 718.67 g n-hexyl acrylate is added over a period of ninety minutes to the reactor. During the reagent feed the temperature of the reaction is held at 118-122° C. The reaction conditions are maintained after completion of the reagent feed until a conversion of 56% of n-hexyl acrylate is achieved. This is to create the remainder of the non-reactive segment at the center of the polymer, the total theoretical Mn of the non-reactive segment is 35,000 g/mol. At this time, 5.72 g of methacrylic acid are added and reaction conditions are maintained until a conversion of 80% of n-hexyl acrylate is achieved creating a reactive segment of theoretical Mn=7,500 g/mol. This creates a first mode of reactive polymer of theoretical Mn=50,000 g/mol. At 80% conversion 6.72 g of n-dodecyl mercaptan are added and reaction conditions are maintained until a conversion of n-Hexyl acrylate of greater than 98% is achieved to create a non-reactive polymer mode of theoretical Mn=12,500 g/mol. The resulting solution polymer is then cooled to ambient temperature and discharged from the reactor.

The resulting reactive acrylic polymer mode contains 99.30% n-hexyl acrylate and 0.70% methacrylic acid based on 100% by weight of the reactive acrylic polymer mode. The resulting non-reactive polymer mode contains 100% n-hexyl acrylate. The measured molecular weight (Mn) of the total acrylic polymer is 23,300 g/Mole (determined by gel permeation chromatography relative to polystyrene standards) and the polydispersity is 4.70.

Aluminum acetoacetonate in an amount of 1.00% based on solids and 40% based on solids terpene phenolic resin is added to the acrylic polymer. The adhesive composition is dried at 90° C. for 20 minutes to ensure complete cross-linking of the acrylic polymer.

| PHYSICAL TESTING | | |
|---|---|---|
| Solids | 83.23 | 15 min under lamps calibrated to 200° C. |
| Viscosity | 18200 cps | Brookfield RV Viscometer Spindle #7@ 100 Rpm 45.3% torque |
| % Conversion | >98.1% | gas chromatography |

Example 4: Preparation of Segmented Acrylic Polymer Having Acid Functionality Using SFRP Agent A polymer is prepared substantially in accordance with Example 3, with the exception that in the crosslinking step, 1.00% based on solids of tri-functional aziridine and 40% based on solids terpene phenolic resin is added to the acrylic polymer. The adhesive composition is dried at 90° C. for 20 minutes to ensure complete cross-linking of the acrylic polymer.

Test Results

The adhesives of Examples 3 and 4 are coated onto 2-mil polyethylene terephthalate at 58-62 grams per square meter (gsm) and dried at 90° C. for 20 minutes. The test results appear in Table 3 below.

Example 5: Preparation of Segmented Acrylic Polymer Having Anhydride Functionality Using SFRP Agent An acrylic copolymer with reactive functionalities positioned in the segment adjacent to the polymer chain ends is prepared as follows. Into a 2000 ml reactor equipped with a heating jacket, agitator, reflux condenser, feed tanks and nitrogen gas inlet there is charged 302.33 g of butyl acetate. Monomers and SFRP agent are added in the following amounts to generate a portion of the non-reactive segment at the center of the polymer chain of the reactive polymer mode.

298.24 g of n-Hexyl Acrylate
15.96 g of BlocBuilder® functionalized 1,3-butanediol diacrylate (SFRP agent)

The reactor charge is heated to greater than 65° C. (reactor jacket 70° C.) with a constant nitrogen purge and held for 30 minutes. After the hold the reactor charge mixture is heated to 120° C. (reactor jacket 130° C.). After a peak temperature of 120-125° C. is reached, the reaction conditions are maintained for 30 minutes. A reagent feed mixture with an active nitrogen purge of 129.49 g ethyl acetate and 718.67 g n-hexyl acrylate is added over a period of ninety minutes to the reactor. During the reagent feed, the temperature of the reaction is held at 118-122° C. The reaction conditions are maintained after completion of the reagent feed until a conversion of 56% of n-hexyl acrylate is achieved. This is to create the remainder of the non-reactive segment at the center of the polymer, the total theoretical Mn of the non-reactive segment is 35,000 g/mol. At this time, 6.51 g of maleic anhydride are added and reaction conditions are maintained until a conversion of 80% of n-hexyl acrylate is achieved creating a reactive segment of theoretical Mn=7,500 g/mol. This creates a first mode of reactive polymer of theoretical Mn=50,000 g/mol. At 80% conversion 6.72 g of n-dodecyl mercaptan are added and reaction conditions are maintained until a conversion of n-Hexyl acrylate of greater than 98% is achieved to create a non-reactive polymer mode of theoretical Mn=12,500 g/mol. The resulting solution polymer is then cooled to ambient temperature and discharged from the reactor.

The resulting reactive acrylic polymer mode contains 99.30% n-hexyl acrylate and 0.70% maleic anhydride based on 100% by weight of the reactive acrylic polymer mode. The resulting non-reactive polymer mode contains 100% n-hexyl acrylate. The measured molecular weight (Mn) of the total acrylic polymer is 24800 (determined by gel permeation chromatography relative to polystyrene standards) and the polydispersity is 4.50.

Tyzor GBA in an amount of 2.00% based on solids and 40% of a 100 part formulation terpene phenolic resin is added to the acrylic polymer. The adhesive composition is dried at 90° C. for 20 minutes to ensure complete cross-linking of the acrylic polymer.

| PHYSICAL TESTING | | |
|---|---|---|
| Solids | 83.23% | 15 min under lamps calibrated to 200° C. |
| Viscosity | 5376 cps | Brookfield RV Viscometer Spindle #5@ 50 Rpm 67.2% torque |
| % Conversion | >98% | gas chromatography |

Test Results

The adhesive is coated onto 2-mil polyethylene terephthalate at 58-62 grams per square meter (gsm) and dried at 90° C. for 20 minutes. The test results appear in Table 3 below.

Example 6: Preparation of Segmented Acrylic Polymer Having Silane Functionality Using RAFT Agent An acrylic copolymer with reactive functionalities positioned in the segment adjacent to the polymer chain ends is prepared as follows. Into a 500 ml reactor equipped with a heating jacket, agitator, reflux condenser, feed tanks and nitrogen gas inlet there is charged 28.13 g of ethyl acetate. Monomers and RAFT agent are added in the following amounts to generate the segment adjacent to the polymer chain ends.

30.06 g of 2-Ethylhexyl Acrylate
9.94 g of Methacryloxy methyl Trimethoxy Silane (Genosil XL-33 from Wacker)
2.32 g of dibenzyl trithiocarbonate (DBTTC, RAFT agent)
2.70 g Trimethyl ortho formate The reactor charge is heated to reflux conditions (reactor jacket 85° C.) with a constant nitrogen purge. Once solvent reflux is attained, an initiator solution of 0.087 g 2,2'-azobis(isobutyronitrile) (AIBN, Vazo-64) and 9.38 g acetone is added to the reactor. After a positive sign of reaction (peak temperature 74-78° C.) is reached, the reaction conditions are maintained for 60 minutes at which point >60% of the monomers are consumed to generate the reactive segment of a theoretical Mn of 2500 g/mole. A reagent feed mixture with an active nitrogen purge of 93 g ethyl acetate, 360 g 2-ethylhexyl acrylate, and 0.087 g Vazo-64 is added over a period of two and one half hours to the reactor. During the reagent feed, the temperature of the reaction is held at 79-81° C. The reaction conditions are maintained for 2 hours after completion of the reagent feed at which point >95.0% of the monomers are consumed to generate a nonreactive segment of theoretical Mn of 50000 g/mole. The resulting solution polymer is then cooled to ambient temperature and discharged from the reactor.

The resulting acrylic polymer contains 97.52% 2-ethylhexyl acrylate, and 2.48% Genosil XL-33 based on 100% by weight of the acrylic polymer. The measured molecular weight (Mn) of the acrylic polymer is 34953 g/Mole (determined by gel permeation chromatography relative to polystyrene standards) and the polydispersity is 1.77.

| PHYSICAL TESTING | | |
|---|---|---|
| Solids | 73.6 Tsc % | 40 min in 120° C. oven |
| Viscosity | 2848 | Brookfield RV Viscometer Spindle #5@ 100 Rpm 73.6% torque |
| % Conversion | 95.2% | gas chromatography |

Di-butyl tin acetyl acetonate in an amount of 0.5% based on solids is added to the acrylic polymer. Slyvagum TR-105, a polyterpene resin from Arizona Chemical, is added in an amount of 40% by weight based on the total polymer weight of solids. 5% based on total polymer weight of methanol is also added to ensure stability of the acrylic copolymer. The adhesive composition is dried at 140° C. for 10 minutes to ensure complete cross-linking of the acrylic copolymer.

Test Results

The adhesive is coated onto 2-mil polyethylene terephthalate at 58-62 grams per square meter (gsm) and dried at 140° C. for 10 minutes. The test results appear in Table 2 below.

| Test | Ex. 6 |
|---|---|
| (a) 180 peel/ SS/ 15 min dwell (lb/in) | 6.84[1] |
| (a) 180 peel/ SS/ 72 hours dwell (lb/in) | 6.94[1] |
| (b) 180 peel/ HDPE/ 15 min dwell (lb/in) | 6.44[1] |
| (b) 180 peel/ HDPE/ 72 hours dwell (lb/in) | 6.69[1] |
| (b) 180 peel/ PP/ 15 min dwell (lb/in) | 6.26[1] |
| (b) 180 peel/ PP/ 72 hours dwell (lb/in) | 6.39[1] |
| (c) Static Shear (min.) | 2640.2[3] |
| (d) SAFT (° C.) | 88.0[2] |

[1]adhesive transfer
[2]adhesive failure
[3]cohesive failure

Example 7: Preparation of Segmented Acrylic Polymer Having Silane Functionality Using RAFT Agent (Middle Functional)

An acrylic copolymer with reactive functionalities positioned in the segment in the middle of the polymer chain is prepared as follows. Into a 500 ml reactor equipped with a heating jacket, agitator, reflux condenser, feed tanks and nitrogen gas inlet there is charged 56.25 g of ethyl acetate. Monomers and RAFT agent are added in the following amounts to generate the segment adjacent to the polymer chain ends.

80 g of 2-Ethylhexyl Acrylate
2.32 g of dibenzyl trithiocarbonate (RAFT agent)
2.70 g Trimethyl ortho formate The reactor charge is heated to reflux conditions (reactor jacket 85° C.) with a constant nitrogen purge. Once solvent reflux is attained, an initiator solution of 0.087 g 2,2'-azobis(isobutyronitrile) (AIBN, Vazo-64) and 10.0 g acetone is added to the reactor. After a positive sign of reaction (peak temperature 74-78° C.) is attained, the reaction conditions are maintained for 5 minutes at which point a reagent feed mixture with an active nitrogen purge of 55 g ethyl acetate, 310.08 g 2-ethylhexyl acrylate, and 0.087 g Vazo-64 is added over a period of two and one half hours to the reactor.

Over the two and one half hour reagent feed, the temperature of the reaction is held at 79-81° C. 30 minutes after the reagent feed is finished approximately 90% of the monomer is consumed to generate two non-reactive segments adjacent to the ends of the polymer with theoretical number average molecular weights of 22,500 g/mole. 9.94 g of Methacryloxy methyl Trimethoxy Silane (Genosil XL-33 from Wacker) is then added to the reactor and the mixture is maintained at 79-81° C. for two additional hours to generate a reactive segment in the middle of the polymer that has a theoretical molecular weight of 5000 g/mole. The resulting solution polymer is then cooled to ambient and discharged from the reactor.

The resulting acrylic polymer contains 97.52% 2-ethylhexyl acrylate, and 2.48% Genosil XL-33 based on 100% by weight of the acrylic polymer.

| PHYSICAL TESTING | | |
| --- | --- | --- |
| Solids | Tsc % 74.8 | 40 min in 120° C. oven |
| Viscosity | 1792 cps | Brookfield RV Viscometer Spindle #4@ 50 Rpm 45% torque |
| % Conversion | 98.6 | gas chromatography |

0.5% based on solids di-butyl tin acetyl acetonate is added to the acrylic polymer. 40% Slyvagum TR-105, a polyterpene resin from Arizona Chemical, is added based on solids. The adhesive composition is dried at 130° C. for 10 minutes to ensure complete cross-linking of the acrylic copolymer.
Test Results The adhesive is coated onto 2-mil polyethylene terephthalate at 58-62 grams per square meter (gsm) and dried at 130° C. for 10 minutes. The test results appear in Table 3 below.

Example 8: Preparation of Segmented Acrylic Polymer Having Acid Functionality Using SFRP Agent An acrylic copolymer with reactive functionalities positioned in the segment adjacent to the polymer chain ends is prepared as follows. Into a 2000 ml reactor equipped with a heating jacket, agitator, reflux condenser, feed tanks and nitrogen gas inlet there is charged 308.97 g of butyl acetate. Monomers and SFRP agent are added in the following amounts to generate a portion of the non-reactive segment at the center of the polymer chain of the reactive polymer mode.
  244.0 g of n-butyl acrylate
  61.0 g of tert-butyl acrylate
  7.83 g of BlocBuilder® functionalized 1,3-butanediol diacrylate (SFRP agent)

The reactor charge is heated to greater than 65° C. (reactor jacket 70° C.) with a constant nitrogen purge and held for 30 minutes. After the hold the reactor charge mixture is heated to 120° C. (reactor jacket 130° C.). After a peak temperature of 120-125° C. is attained, the reaction conditions are maintained for 30 minutes. A reagent feed mixture with an active nitrogen purge of 132.42 g ethyl acetate, 587.97 g n-butyl acrylate, and 146.99 g tert-butyl acrylate is added over a period of ninety minutes to the reactor. Over the ninety minute reagent feed the temperature of the reaction is held at 118-122° C. The reaction conditions are maintained after completion of the reagent feed until a conversion of 55% of n-butyl acrylate and tert-butyl acrylate is achieved. This is to create the remainder of the non-reactive segment at the center of the polymer, the total theoretical Mn of the non-reactive segment is 71,500 g/mol. At this time, 5.61 g of methacrylic acid are added and reaction conditions are maintained until a conversion of 70% of n-butyl acrylate and tert-butyl acrylate is achieved creating a reactive segment of theoretical Mn=9,750 g/mol. This creates a first mode of reactive polymer of theoretical Mn=91,000 g/mol. At 70% conversion 1.96 g of n-dodecyl mercaptan are added and reaction conditions are maintained until a conversion of n-butyl acrylate and tert-butyl acrylate of greater than 98% is achieved to create a non-reactive polymer mode of theoretical Mn=38,500 g/mol. The resulting solution polymer is then cooled to ambient and discharged from the reactor.

The resulting reactive acrylic polymer mode contains 79.39% n-butyl acrylate, 19.85% tert-butyl acrylate, and 0.76% methacrylic acid based on 100% by weight of the reactive acrylic polymer mode. The resulting non-reactive polymer mode contains 80.00% n-butyl acrylate and 20.00% tert-butyl acrylate. The measured molecular weight (Mn) of the total acrylic polymer is 33,700 (determined by gel permeation chromatography relative to polystyrene standards) and the polydispersity is 4.32.

Aluminum Acetoacetonate in an amount of 1.0% based on solids and 20% based on solids terpene phenolic resin is added to the acrylic polymer. The adhesive composition is dried at 90° C. for 20 minutes to ensure complete cross-linking of the acrylic polymer.

Example 9

An acrylic polymer was prepared substantially in accordance with Example 8, with the exception that 1.0% based on solids of tri-functional aziridine and 20% based on solids terpene phenolic resin is added to the acrylic polymer. The adhesive composition is dried at 90° C. for 20 minutes to ensure complete cross-linking of the acrylic polymer.
Test Results The adhesives of Examples 8 and 9 are coated onto 2-mil polyethylene terephthalate at 58-62 grams per square meter (gsm) and dried at 90° C. for 20 minutes. The test results appear in Table 3 below.

Comparative Example 10: Preparation of Random Acrylic Polymer Containing Methacrylic Acid (High Molecular Weight)

An acrylic copolymer with methacrylic acid distributed randomly throughout the polymer backbone is prepared as follows. Into a 1500 ml reactor equipped with a heating jacket, agitator, reflux condenser, feed tanks and nitrogen gas inlet there is charged 63.67 g of ethyl acetate, and 25.06 g acetone. Monomers are added in the following amounts:
  74.3 g butyl acrylate
  20.37 g of tert-butyl acrylate The reactor charge is heated to reflux conditions (reactor jacket 85° C.) with a constant nitrogen purge. Once solvent reflux is attained, an initiator solution of 0.19 g benzoyl peroxide (Luperox A) and 4.24 g ethyl acetate is added to the reactor. After a peak temperature of 76-78° C. is attained, a reagent feed mixture with an active nitrogen purge of 381.99 g ethyl acetate, 364.9 g butyl acrylate, 100.0 g tert-butyl acrylate, 2.96 g methacrylic acid and 1.04 g Luperox A is added over a period of three hours to the reactor. Over the three hour reagent feed the temperature of the reaction is held under reflux conditions at 75-79° C. The reaction conditions are maintained for 30 minutes after completion of the reagent feed. A mixture of 1.54 g t-amylperoxy pivalate (Luperox 554) and 37.15 g of ethyl acetate is added to the reactor over 30 minutes. The reaction is held at reflux conditions for an additional hour at which point it is diluted with 120 g of ethyl acetate. The resulting solution polymer is then cooled to ambient and discharged from the reactor.

The resulting acrylic polymer contains 77.93% butyl acrylate, 21.36 tert butyl acrylate, and 0.526% methacrylic acid based on 100% by weight of the acrylic polymer. The molecular weight (Mn) of the acrylic polymer is 73,200 g/mole (determined by gel permeation chromatography relative to polystyrene standards) and the polydispersity is 4.9.

| PHYSICAL TESTING | | |
|---|---|---|
| Solids | 47.66 Tsc % | 40 min in 120° C. oven |
| Viscosity | 4750 cps | Brookfield RV Viscometer Spindle #3@ 12 Rpm 73.6% torque |
| % Conversion | 99.0% | gas chromatography |

In example 10, 1.0% based on solids of Aluminum Acetoacetonate and 20% based on solids terpene phenolic resin is added to the acrylic polymer. The adhesive composition is dried at 90° C. for 20 minutes to ensure complete cross-linking of the acrylic polymer.

Comparative Example 11

A polymer is prepared substantially in accordance with Example 10 with the exception that in the crosslinking step, 1.0% based on solids of tri-functional aziridine and 20% based on solids terpene phenolic resin is added to the acrylic polymer. The adhesive composition is dried at 90° C. for 20 minutes to ensure complete cross-linking of the acrylic polymer.
Test Results The adhesives of Comparative Examples 10 and 11 are coated onto 2-mil polyethylene terephthalate at 58-62 grams per square meter (gsm) and dried at 90° C. for 20 minutes. The test results appear in Table 3 below.

Comparative Example 12: Preparation of Random Acrylic Polymer Containing Methacrylic Acid. (Low Molecular Weight Version)

An acrylic copolymer with methacrylic acid distributed randomly throughout the polymer backbone is prepared as follows. Into a 1500 ml reactor equipped with a heating jacket, agitator, reflux condenser, feed tanks and nitrogen gas inlet there is charged 54.8 g of ethyl acetate, 8.87 isopropanol and 25.06 g acetone. Monomers are added in the following amounts:
 74.3 g butyl acrylate
 20.37 g of tert-butyl acrylate The reactor charge is heated to reflux conditions (reactor jacket 85° C.) with a constant nitrogen purge. Once solvent reflux is attained, an initiator solution of 0.19 g benzoyl peroxide (Luperox A) and 4.24 g ethyl acetate is added to the reactor. After a peak temperature of 76-78° C. is attained, a reagent feed mixture with an active nitrogen purge of 286.3 g ethyl acetate, 31.8 g isopropanol, 364.9 g butyl acrylate, 100.0 g tert-butyl acrylate, 2.96 g methacrylic acid and 1.04 g Luperox A is added over a period of three hours to the reactor. Over the three hour reagent feed the temperature of the reaction is held under reflux conditions at 75-79° C. The reaction conditions are maintained for 30 minutes after completion of the reagent feed. A mixture of 1.54 g t-amylperoxy pivalate (Luperox 554) and 37.15 g of ethyl acetate is added to the reactor over 30 minutes. The reaction is held at reflux conditions for an additional hour at which point it is diluted with 120 g of ethyl acetate. The resulting solution polymer is then cooled to ambient and discharged from the reactor.

The resulting acrylic polymer contains 77.93% butyl acrylate, 21.36 tert butyl acrylate, and 0.526% methacrylic acid based on 100% by weight of the acrylic polymer. The molecular weight (Mn) of the acrylic polymer is 30,800 g/mole (determined by gel permeation chromatography relative to polystyrene standards) and the polydispersity is 3.1. 210 g of 100% solids polymer was then dissolved in 90 g of ethyl acetate to yield a solution acrylic.

| PHYSICAL TESTING | | |
|---|---|---|
| Solids | 52.8 Tsc % | 40 min in 120° C. oven |
| Viscosity | 590 cps | Brookfield RV Viscometer Spindle #5@ 100 Rpm 73.6% torque |
| % Conversion | 98.0% | gas chromatography |

Aluminum Acetoacetonate in an amount of 1.0% based on solids and 20% based on solids terpene phenolic resin is added to the acrylic polymer. The adhesive composition is dried at 90° C. for 20 minutes to ensure complete cross-linking of the acrylic polymer.

Comparative Example 13

An acrylic polymer was prepare substantially in accordance with Example 12, with the exception that 1.0% based on solids of tri-functional aziridine and 20% based on solids terpene phenolic resin is added to the acrylic polymer. The adhesive composition is dried at 90° C. for 20 minutes to ensure complete cross-linking of the acrylic polymer.
Test Results The adhesives of Comparative Examples 12 and 13 are coated onto 2-mil polyethylene terephthalate at 58-62 grams per square meter (gsm) and dried at 90° C. for 20 minutes. The test results appear in Table 3 below.

TABLE 3

| Example | 180 Peel SS 15 min/ (lb/min) | 180 Peel SS 24 H/ (lb/min) | 180 Peel HDPE 15 min/ (lb/min) | 180 Peel HDPE 24 H/ (lb/min) | Static Sheer (min.) | SAFT (° C.) |
|---|---|---|---|---|---|---|
| 1 | 3.67 | 3.68 | 0.56 | 0.74 | 644.4 | 148.6[2] |
| Comp. 2 | 1.78 | 1.79 | 0.16 | 0.24 | 4266.7[1] | 195.7[3] |
| 3 | 6.39[1] | 6.38[1] | 6.04[1] | 5.68[1] | 50.6[3] | 46.3[3] |
| 4 | 6.36[1] | 6.33[1] | 3.73 | 3.46 | 2087.1[2] | 144.3[1] |
| 5 | 6.12[1] | 6.04[1] | 5.74[1] | 5.70[1] | 3.60[3] | — |
| 6 | 6.84[1] | — | 6.44[1] | — | 2640.2[3] | 88.0[2] |

TABLE 3-continued

| Example | 180 Peel SS 15 min/ (lb/min) | 180 Peel SS 24 H/ (lb/min) | 180 Peel HDPE 15 min/ (lb/min) | 180 Peel HDPE 24 H/ (lb/min) | Static Sheer (min.) | SAFT (° C.) |
|---|---|---|---|---|---|---|
| 7 | 1.12 | 1.14 | 0.82 | 1.00 | 2.3 | 40 |
| 8 | 4.84 | 5.33 | 1.58 | 1.65 | 5722.2[3] | 151.0 |
| 9 | 5.36 | 5.43 | 1.83 | 1.81 | 10000[2] | 200.0 |
| Comp. 10 | 4.26 | 5.35 | 1.55 | 1.52 | 4182.87[3] | 136.63[3] |
| Comp. 11 | 4.50 | 5.70 | 2.01 | 1.96 | 10000[2] | 200 |
| Comp. 12 | 7.26[1] | 7.44[1] | 2.08 | 2.25 | 55.87[3] | 51.7[3] |
| Comp. 13 | 9.04[1] | 8.75[1] | 2.72 | 2.64 | 8010.2[2] | 197.4[1] |

[1] adhesive transfer
[2] adhesive failure
[3] cohesive failure

Example 14: Preparation of Segmented Acrylic Polymer Having Acid Functionality Using SFRP Agent An acrylic copolymer with reactive functionality positioned in the segment adjacent to the polymer chain end is prepared as follows. Into a 500 ml reactor equipped with a heating jacket, agitator, reflux condenser, feed tanks and nitrogen gas inlet there is charged 52.9 g of butyl acetate. Monomers and SFRP agent are added in the following amounts to generate the reactive segment adjacent to the non-reactive polymer mode.
  14.20 g of n-Butyl Acrylate
  1.09 g of Acrylic Acid
  22.21 g of tert. Butyl Acrylate
  1.50 g of BlocBuilder (SFRP agent)

The reactor charge is heated to greater than 35° C. (reactor jacket 45° C.) with a constant nitrogen purge and held for 30 minutes. After the hold, the reactor charge mixture is heated to greater than 65° C. (reactor jacket 75° C.) and held for 30 min. After the second hold, the reactor charge mixture is heated to greater than 120° C. (reactor jacket 130° C.). Once the reactor charge reaches a temperature of 110° C., T=0 is set. At T=15 minutes, a sample is taken for Gas Chromatography Analysis to check for monomer conversion. After monomer conversion is confirmed (approximately 30 minutes, T=45), a reagent feed mixture with an active nitrogen purge of 79.36 g Butyl Acetate, 127.82 g n-Butyl Acrylate, and 199.93 g of tert. Butyl Acrylate is added over a period of ninety minutes to the reactor. During the reagent feed the temperature of the reaction is held at 118-122° C. The reaction conditions are maintained after completion of the reagent feed until a conversion of 80% of n-Butyl Acrylate is achieved. This is to create a non-reactive segment adjacent to a gradient composition of functional end segment. This creates a first mode of reactive polymer of theoretical Mn=75,000 g/mol. At 80% conversion 0.77 g of n-dodecyl mercaptan are added and reaction conditions are maintained until greater than 98% conversion is achieved to create a non-reactive polymer mode of theoretical Mn=19,000 g/mol. The resulting solution polymer is then cooled to ambient temperature and discharged from the reactor.

The first resulting reactive acrylic polymer mode contains 38.88% n-butyl acrylate, 60.82% tert. Butyl Acrylate, and 0.30% acrylic acid based on 100% by weight of the reactive acrylic polymer mode. The second resulting reactive polymer mode contains the same weight percentages. The measured molecular weight (Mn) of the total acrylic polymer is 52,158 g/Mole (determined by gel permeation chromatography relative to polystyrene standards) and the polydispersity is 1.42.

| PHYSICAL TESTING (EX. 14) | | |
|---|---|---|
| Solids | 72.69% | 40 min in 120° C. oven |
| Viscosity | 16780 cps | Brookfield RV Viscometer Spindle #5@ 20 Rpm 73.6% torque |
| % Conversion | >98.1% | gas chromatography |

Aluminum acetoacetonate in an amount of 0.45% based on solids and was added to the acrylic polymer. The adhesive composition is air dried for 5 minutes and then at 140° C. for 10 minutes to ensure complete cross-linking of the acrylic polymer.

Example 14A: Preparation of Segmented Acrylic Polymer Having Acid Functionality Using SFRP Agent A polymer was prepared substantially in accordance with Example 14, with the exception that in the crosslinking step, 0.45% based on solids of tri-functional aziridine was added to the acrylic polymer. The adhesive composition is air dried for 5 minutes and then at 140° C. for 10 minutes to ensure complete cross-linking of the acrylic polymer.

Test Results

The adhesives are coated onto 2-mil polyethylene terephthalate at 58-62 grams per square meter (gsm) and air dried for 5 minutes and then at 140° C. for 10 minutes. The test results are shown below in Table 4.

TABLE 4

| Test | Ex. 6 | Ex. 14A |
|---|---|---|
| (a) 180 peel to stainless steel 15 min dwell (lb/in) | 3.78zip/tr | 4.79 |
| (a) 180 peel to stainless steel 24 hours dwell (lb/in) | 4.85 | 6.75 |
| (b) 180 peel to HDPE 15 min dwell (lb/in) | .1 zip | .25zip |
| (b) 180 peel to HDPE 24 hours dwell (lb/in) | .1 zip | .25zip |
| (c) Static Shear 1/2 X1 X1 kg stainless (min.) | 2745.9 split | 10000 |
| (d) SAFT 2.2 lb/in$^2$ (° C.) | 72.5 | 200 |

Example 15: Preparation of Segmented Acrylic Polymer Having Acid Functionality Using SFRP Agent An acrylic copolymer with reactive functionality positioned in the segment adjacent to the polymer chain end is prepared as follows. Into a 500 ml reactor equipped with a heating jacket, agitator, reflux condenser, feed tanks and nitrogen gas inlet there is charged 86.12 g of butyl acetate. Monomers and SFRP agent are added in the following amounts to generate the reactive segment adjacent to the non-reactive polymer mode.

37.23 g of n-Butyl Acrylate 1.73 g of Acrylic Acid 4.44 g of n,n Dimethyl Acrylamide 46.53 g of tert. Butyl Acrylate 1.42 g of BlocBuilder (SFRP agent)

The reactor charge is heated to greater than 35° C. (reactor jacket 45° C.) with a constant nitrogen purge and held for 30 minutes. After the hold, the reactor charge mixture is heated to greater than 65° C. (reactor jacket 75° C.) and held for 30 min. After the second hold, the reactor charge mixture is heated to greater than 120° C. (reactor jacket 130° C.). Once the reactor charge reaches a temperature of 110° C., T=0 is set. At T=15 minutes, a sample is taken for Gas Chromatography Analysis to check for monomer conversion. After monomer conversion is confirmed (approximately 30 minutes, T=45), a reagent feed mixture with an active nitrogen purge of 60.79 g Butyl Acetate, 109.56 g n-Butyl Acrylate, 136.94 g of tert. Butyl Acrylate, and 13.04 g of n,n Dimethyl Acrylamide is added over a period of ninety minutes to the reactor. During the reagent feed the temperature of the reaction is held at 118-122° C. The reaction conditions are maintained after completion of the reagent feed until a conversion of 80% of n-Butyl Acrylate is achieved. This is to create a non-reactive segment adjacent to a gradient composition of functional end segment. This creates a first mode of reactive polymer of theoretical Mn=75,000 g/mol. At 80% conversion 0.77 g of n-dodecyl mercaptan are added and reaction conditions are maintained until greater than 98% conversion is achieved to create a non-reactive polymer mode of theoretical Mn=19,000 g/mol. The resulting solution polymer is then cooled to ambient temperature and discharged from the reactor.

The first resulting reactive acrylic polymer mode contains 42.00% n-butyl acrylate, 52.50% tert. Butyl Acrylate, 5.00% n,n Dimethyl Acrylamide, and 0.5% acrylic acid based on 100% by weight of the reactive acrylic polymer mode. The second resulting reactive polymer mode contains the same weight percentages. The measured molecular weight (Mn) of the total acrylic polymer is 20,860 g/Mole (determined by gel permeation chromatography relative to polystyrene standards) and the polydispersity is 3.5.

| PHYSICAL TESTING (EX. 15) | | |
|---|---|---|
| Solids | 72.77% | 30 min in 140° C. oven |
| Viscosity | 36200 cps | Brookfield RV Viscometer Spindle #6@ 20 Rpm 72.3% torque |
| % Conversion | >98.1% | gas chromatography |

Aluminum acetoacetonate in an amount of 0.77% based on solids and was added to the acrylic polymer. The adhesive composition is air dried for 5 minutes and then at 140° C. for 10 minutes to ensure complete cross-linking of the acrylic polymer.

Test Results

The adhesives are coated onto 2-mil polyethylene terephthalate at 58-62 grams per square meter (gsm) and air dried for 5 minutes and then at 140° C. for 10 minutes. The rest results are shown below in Table 5.

TABLE 5

| Test | Ex. 15 |
|---|---|
| (a) 180 peel to stainless steel 15 min dwell (lb/in) | 4.84 |
| (a) 180 peel to stainless steel 24 hours dwell (lb/in) | 5.65 |
| (b) 180 peel to HDPE 15 min dwell (lb/in) | .05 |
| (b) 180 peel to HDPE 24 hours dwell (lb/in) | N/A |
| (c) Static Shear 1/2 X1 X1 kg stainless (min.) | 10,000 |
| (d) SAFT 2.2 lb/in$^2$ (° C.) | N/A |

Example 16: Preparation of Segmented Acrylic Polymer Having Acid Functionality Using SFRP Agent An acrylic copolymer with reactive functionality positioned in the segment adjacent to the polymer chain end is prepared as follows. Into a 500 ml reactor equipped with a heating jacket, agitator, reflux condenser, feed tanks and nitrogen gas inlet there is charged 93.88 g of butyl acetate. Monomers and SFRP agent are added in the following amounts to generate the reactive segment adjacent to the non-reactive polymer mode.

68.54 g of n-Butyl Acrylate 9.39 g of Isobornyl Acrylate 1.74 g of Acrylic Acid 6.57 g of n,n Dimethyl Acrylamide 9.39 g of tert. Butyl Acrylate 1.53 g of BlocBuilder (SFRP agent)

The reactor charge is heated to greater than 35° C. (reactor jacket 45° C.) with a constant nitrogen purge and held for 30 minutes. After the hold, the reactor charge mixture is heated to greater than 65° C. (reactor jacket 75° C.) and held for 30 min. After the second hold, the reactor charge mixture is heated to greater than 120° C. (reactor jacket 130° C.). Once the reactor charge reaches a temperature of 110° C., T=0 is set. At T=15 minutes, a sample is taken for Gas Chromatography Analysis to check for monomer conversion. After monomer conversion is confirmed (approximately 30 minutes, T=45), a reagent feed mixture with an active nitrogen purge of 31.29 g Butyl Acetate, 205.6 g n-Butyl Acrylate, 28.17 g of tert. Butyl Acrylate, 19.72 g of n,n Dimethyl Acrylamide, and 28.17 g of Isobornyl Acrylate is added over a period of ninety minutes to the reactor. During the reagent feed the temperature of the reaction is held at 118-122° C. The reaction conditions are maintained after completion of the reagent feed until a conversion of 80% of n-Butyl Acrylate is achieved. This is to create a non-reactive segment adjacent to an a gradient composition of functional end segment. This creates a first mode of reactive polymer of theoretical Mn=75,000 g/mol. At 80% conversion 0.81 g of n-dodecyl mercaptan are added and reaction conditions are maintained for 30 minutes. After this hold, 0.29 g of Acrylic Acid are added and reaction conditions are maintained until a conversion of n-Butyl Acrylate of greater than 98% is achieved to create a reactive polymer mode of theoretical Mn=19,000 g/mol. The resulting solution polymer is then cooled to ambient temperature and discharged from the reactor.

The first resulting reactive acrylic polymer mode contains 72.66% n-butyl acrylate, 9.96% Isobornyl acrylate, 9.96% tert. Butyl Acrylate, 6.97% n,n Dimethyl Acrylamide, and 0.46% acrylic acid based on 100% by weight of the reactive acrylic polymer mode. The second resulting reactive polymer mode contains 72.94% n-butyl acrylate, 9.99% Isobornyl acrylate, 9.99% tert. Butyl Acrylate, 6.99% n,n Dimethyl Acrylamide, and 0.08% acrylic acid based on 100% by weight of the reactive acrylic polymer mode. The measured molecular weight (Mn) of the total acrylic polymer is 21,700 g/Mole (determined by gel permeation chromatography relative to polystyrene standards) and the polydispersity is 3.8.

| PHYSICAL TESTING (EX. 16) | | |
|---|---|---|
| Solids | 78.32% | 30 min in 140° C. oven |
| Viscosity | 57900 cps | Brookfield RV Viscometer Spindle #6@ 10 Rpm 58% torque |
| % Conversion | >98.1% | gas chromatography |

Aluminum acetoacetonate in an amount of 0.80% based on solids and was added to the acrylic polymer. The adhesive composition is air dried for 5 minutes and then at 140° C. for 10 minutes to ensure complete cross-linking of the acrylic polymer.

Example 16A: Preparation of Segmented Acrylic Polymer Having Acid Functionality Using SFRP Agent A polymer was prepared substantially in accordance with Example 16, with the exception that in the crosslinking step, 0.57% based on solids of tri-functional aziridine was added to the acrylic polymer. The adhesive composition is air dried for 5 minutes and then at 140° C. for 10 minutes to ensure complete cross-linking of the acrylic polymer.

Test Results

The adhesives are coated onto 2-mil polyethylene terephthalate at 58-62 grams per square meter (gsm) and air dried for 5 minutes and then at 140° C. for 10 minutes. The test results are shown below in Table 6.

TABLE 6

| Test | Ex. 16 | Ex. 16A |
|---|---|---|
| (a) 180 peel to stainless steel 15 min dwell (lb/in) | 4.1 | 4.37 |
| (a) 180 peel to stainless steel 24 hours dwell (lb/in) | 7.15splittr | 4.63 |
| (b) 180 peel to HDPE 15 min dwell (lb/in) | .59 | 1.19 |
| (b) 180 peel to HDPE 24 hours dwell (lb/in) | .68 | 1.19 |
| (c) Static Shear 1/2 X1 X1 kg stainless (min.) | 474.4 split | 10000 |
| (d) SAFT 2.2 lb/in$^2$ (° C.) | N/A | 200 |

Example 17: Preparation of Segmented Acrylic Polymer Having Acid Functionality Using SFRP Agent An acrylic copolymer with reactive functionality positioned in the segment adjacent to the polymer chain end is prepared as follows. Into a 500 ml reactor equipped with a heating jacket, agitator, reflux condenser, feed tanks and nitrogen gas inlet there is charged 37.5 g of butyl acetate. Monomers and SFRP agent are added in the following amounts to generate the reactive segment adjacent to the non-reactive polymer mode.

17.21 g of n-Butyl Acrylate
4.63 g of Isobornyl Acrylate
1.53 g of Acrylic Acid
1.63 g of BlocBuilder (SFRP agent)

The reactor charge is heated to greater than 35° C. (reactor jacket 45° C.) with a constant nitrogen purge and held for 30 minutes. After the hold, the reactor charge mixture is heated to greater than 65° C. (reactor jacket 75° C.) and held for 30 min. After the second hold, the reactor charge mixture is heated to greater than 120° C. (reactor jacket 130° C.). Once the reactor charge reaches a temperature of 110° C., T=0 is set. At T=15 minutes, a sample is taken for Gas Chromatography Analysis to check for monomer conversion. After monomer conversion is confirmed (approximately 30 minutes, T=45), a reagent feed mixture with an active nitrogen purge of 62.5 g Butyl Acetate, 284.17 g n-Butyl Acrylate, and 89.67 g of Isobornyl Acrylate is added over a period of one hundred eighty minutes to the reactor. During the reagent feed the temperature of the reaction is held at 118-122° C. The reaction conditions are maintained after completion of the reagent feed until a conversion of 80% of n-Butyl Acrylate is achieved. This is to create a non-reactive segment adjacent to a gradient composition of functional end segment. This creates a first mode of reactive polymer of theoretical Mn=75,000 g/mol. At 80% conversion 0.86 g of n-dodecyl mercaptan are added and reaction conditions are maintained for 30 minutes. After this hold, 0.31 g of Acrylic Acid are added and reaction conditions are maintained until a conversion of n-Butyl Acrylate of greater than 98% is achieved to create a reactive polymer mode of theoretical Mn=19,000/mol. The resulting solution polymer is then cooled to ambient temperature and discharged from the reactor.

The first resulting reactive acrylic polymer mode contains 75.87% n-butyl acrylate, 23.74% Isobornyl acrylate, and 0.39% acrylic acid based on 100% by weight of the reactive acrylic polymer mode. The second resulting reactive polymer mode contains 76.11% n-butyl acrylate, 23.81% Isobornyl acrylate, and 0.08% acrylic acid based on 100% by weight of the reactive acrylic polymer mode. The measured molecular weight (Mn) of the total acrylic polymer is 27,200 g/Mole (determined by gel permeation chromatography relative to polystyrene standards) and the polydispersity is 3.5.

| PHYSICAL TESTING (EX. 17) | | |
|---|---|---|
| Solids | 80.4% | 30 min in 140° C. oven |
| Viscosity | 78800 cps | Brookfield RV Viscometer Spindle #6@ 10 Rpm 80% torque |
| % Conversion | >98.1% | gas chromatography |

Aluminum acetoacetonate in an amount of 0.70% based on solids and was added to the acrylic polymer. The adhesive composition is air dried for 5 minutes and then at 140° C. for 10 minutes to ensure complete cross-linking of the acrylic polymer.

Example 17A: Preparation of Segmented Acrylic Polymer Having Acid Functionality Using SFRP Agent A polymer was prepared substantially in accordance with Example 17, with the exception that in the crosslinking step, 0.41% based on solids of tri-functional aziridine was added to the acrylic polymer. The adhesive composition is air dried for 5 minutes and then at 140° C. for 10 minutes to ensure complete cross-linking of the acrylic polymer.

Test Results

The adhesives are coated onto 2-mil polyethylene terephthalate at 58-62 grams per square meter (gsm) and air dried for 5 minutes and then at 140° C. for 10 minutes. The test results are shown below in Table 7.

TABLE 7

| Test | Ex. 17 | Ex. 17A |
|---|---|---|
| (a) 180 peel to stainless steel 15 min dwell (lb/in) | 3.96 | 5.37 |
| (a) 180 peel to stainless steel 24 hours dwell (lb/in) | 6.87 split tr | 5.72 |
| (b) 180 peel to HDPE 15 min dwell (lb/in) | .95 | 1.67 |
| (b) 180 peel to HDPE 24 hours dwell (lb/in) | 1.04 | 1.54 |
| (c) Static Shear ½ X1 X1 kg stainless (min.) | 268.4 | 2654.5 |
| (d) SAFT 2.2 lb/in² (° C.) | N/A | N/A |

Example 18: Preparation of Segmented Acrylic Polymer Having Methacrylic Acid Functionality Using RAFT Agent An acrylic copolymer with reactive functionalities positioned in the segment adjacent to the polymer chain ends is prepared as follows. Into a 500 ml reactor equipped with a heating jacket, agitator, reflux condenser, feed tanks and nitrogen gas inlet there is charged 23.21 g of ethyl acetate. Monomers and RAFT agent are added in the following amounts to generate the segment adjacent to the polymer chain ends.
- 22.75 g of 2-Ethylhexyl Acrylate
- 12.25 g of Isobornyl Acrylate
- 0.68 g of dibenzyl trithiocarbonate (RAFT agent)
- 1.61 g of methacrylic acid The reactor charge is heated to reflux conditions (reactor jacket 85° C.) with a constant nitrogen purge. Once solvent reflux is attained, an initiator solution of 0.038 g 2,2'-azobis(isobutyronitrile) (AIBN, Vazo-64) and 7.25 g acetone is added to the reactor. After a peak temperature range of 75-80° C. is attained, the reaction conditions are maintained for 60 minutes at which point >50% of the monomers are consumed to generate reactive segments yielding a theoretical $M_n$ of 7500 g/mole each. A reagent feed mixture with an active nitrogen purge of 90.0 g ethyl acetate, 204.75 g 2-ethylhexyl acrylate, 110.25 g isobornyl acrylate, and 0.04 g Vazo-64 is added over a period of two and one half hours to the reactor. During the reagent feed, the temperature of the reaction is held at 79-81° C. The reaction conditions are maintained for 90 minutes after completion of the reagent feed at which point >90.0% of the monomers are consumed. A finishing solution is fed into the kettle consisting of 0.19 g tert amyl peroxypivalate, and 30 g of ethyl acetate to consume all remaining monomers to yield a nonreactive segment of theoretical $M_n$ of 135000 g/mole. The resulting solution polymer is then cooled to ambient temperature and discharged from the reactor.

The resulting acrylic copolymer contains 65% 2-ethylhexyl acrylate, and 35% isobornyl acrylate based on 100% by weight of the acrylic copolymer. The measured molecular weight (Mn) of the acrylic copolymer is 54600 (determined by gel permeation chromatography relative to polystyrene standards) and the polydispersity is 1.6.

Physical Properties
Total solids content—71.8% 40 min @ 135° C.
Viscosity—8680 centipoise Spindle #5 @ 20 RPMs Brookfield RVT
Residual 2-EHA—0.58%=98.7% converted 100% based on moles of methacrylic acid were targeted for cross-linking using a tri-functional Aziridine cross-linker on equal molar equivalence. The adhesive composition is dried at room temperature for 5 min, then placed in a oven for 10 min at 130° C.

Test Results

The adhesive is coated onto 2-mil polyethylene terephthalate at 58-62 grams per square meter (gsm) and dried at 130° C. for 10 minutes. The results are shown below in Table 8.

TABLE 8

| Test | Ex. 18 |
|---|---|
| (a) 180 peel to stainless steel 15 min dwell (lb/in) | 8.25 cohesive |
| (a) 180 peel to stainless steel 24 hours dwell (lb/in) | 8.61 cohesive |
| (a) 180 peel to stainless steel 72 hours dwell (lb/in) | 8.68 cohesive |
| (a) 180 peel to high density polyethylene 72 hr dwell (lb/in) | 3.04 |
| (a) 180 peel to polypropylene 72 hours dwell (lb/in) | 5.47 zip, cohesive |
| (e) Static Shear ½ X1 X1 kg stainless (min.) | 5843.7 cohesive |
| (g) SAFT 2.2 lb/in² (° C.) | 94.6 C. cohesive |

Example 19: Preparation of Segmented Acrylic Polymer Having Methacrylic Acid Functionality Using RAFT Agent An acrylic copolymer with reactive functionalities positioned in the segment adjacent to the polymer chain ends and throughout is prepared as follows. Into a 500 ml reactor equipped with a heating jacket, agitator, reflux condenser, feed tanks and nitrogen gas inlet there is charged 24.0 g of ethyl acetate. Monomers and RAFT agent are added in the following amounts to generate the segment adjacent to the polymer chain ends.
- 17.85 g 2-Ethylhexyl Acrylate
- 15.75 g of Butyl acrylate
- 0.68 g of dibenzyl trithiocarbonate (RAFT agent)
- 1.16 g of Trimethoxy propyl silane (silane functionality)
- 2.50 g of Carbamate alkyl trimethoxy silane (silane stabilizer, XL-65))

The reactor charge is heated to reflux conditions (reactor jacket 85° C.) with a constant nitrogen purge. Once solvent reflux is attained, an initiator solution of 0.038 g 2,2'-azobis(isobutyronitrile) (AIBN, Vazo-64) and 7.35 g acetone is added to the reactor. After a peak temperature range of 76-80° C. is attained, the reaction conditions are maintained for 60 minutes at which point >70% of the monomers are consumed to generate reactive segments yielding a theoretical $M_n$ of 7500 g/mole each. A reagent feed mixture with an active nitrogen purge of 87.0 g ethyl acetate, 141.75 g butyl acrylate, 160.65 g 2-ethylhexyl acrylate, 2.50 g XL-65, 14.0 g acrylic acid, and 0.04 g Vazo-64 is added over a period of two and one half hours to the reactor. During the reagent feed, the temperature of the reaction is held at 79-81° C. The reaction conditions are maintained for 90 minutes after completion of the reagent feed at which point >90.0% of the monomers are consumed. A finishing solution is fed into the kettle consisting of 0.19 g tert amyl peroxypivalate, and 30 g of ethyl acetate to consume all remaining monomers to yield a second reactive segment with a theoretical $M_n$ of 135000 g/mole. The resulting solution polymer is then cooled to ambient temperature and discharged from the reactor.

The resulting acrylic copolymer contains 45% butyl acrylate, and 51% 2-ethylhexyl acrylate, 4% acrylic acid based on 100% by weight of the acrylic copolymer. The measured molecular weight (Mn) of the acrylic copolymer is 80060 (determined by gel permeation chromatography relative to polystyrene standards) and the polydispersity is 1.6.

Physical Properties

Total solids content—69% 40 min @ 135° C.
Viscosity—24950 centipoise Spindle #6 @ 20 RPMs Brookfield RVT
Residual Butyl Acrylate—0.6%=98% converted A solution of aluminum acetyl acetonate, 2-4 pentanedione, and toluene (1:3:9 respectively) was added at 0.5% based on solid contents. The adhesive composition is then dried at room temperature for ten minutes then placed in a 140° C. oven for ten minutes.

Test Results

The adhesive is coated onto 2-mil polyethylene terephthalate at 58-62 grams per square meter (gsm) and dried at 140° C. for 10 minutes with a ten minute air dry. The results are shown below in Table 9.

TABLE 9

| Test | Ex. 18 |
| --- | --- |
| (a) 180 peel to stainless steel 15 min dwell (lb/in) | 3.36 |
| (a) 180 peel to stainless steel 24 hours dwell (lb/in) | 8.15 cohesive |
| (a) 180 peel to stainless steel 72 hours dwell (lb/in) | 8.83 cohesive |
| (a) 180 peel to high density polyethylene 72 hr dwell (lb/in) | .2 |
| (a) 180 peel to polypropylene 72 hours dwell (lb/in) | 2.35 |
| (e) Static Shear ½ X1 X1 kg stainless (min.) | 1087.0 stain |
| (g) SAFT 2.2 lb/in2 (° C.) | 200° C. |

Example 20: Preparation of Segmented Acrylic Polymer Having Methacrylic Acid Functionality Using RAFT Agent An acrylic copolymer with reactive functionalities positioned in the segment adjacent to the polymer chain ends is prepared as follows. Into a 500 ml reactor equipped with a heating jacket, agitator, reflux condenser, feed tanks and nitrogen gas inlet there is charged 27.88 g of ethyl acetate. Monomers and RAFT agent are added in the following amounts to generate the segment adjacent to the polymer chain ends.

35.0 g butyl acrylate
1.37 g of dibenzyl trithiocarbonate (RAFT agent)
3.25 g of methacrylic acid The reactor charge is heated to reflux conditions (reactor jacket 85° C.) with a constant nitrogen purge. Once solvent reflux is attained, an initiator solution of 0.074 g 2,2'-azobis(isobutyronitrile) (AIBN, Vazo-64) and 7.78 g acetone is added to the reactor. After a peak temperature range of 78-80° C. is attained, the reaction conditions are maintained for 60 minutes at which point >70% of the monomers are consumed to generate reactive segments yielding a theoretical $M_n$ of 3750 g/mole each. A reagent feed mixture with an active nitrogen purge of 90.0 g ethyl acetate, 315.0 g butyl acrylate, and 0.08 g Vazo-64 is added over a period of two and one half hours to the reactor. During the reagent feed, the temperature of the reaction is held at 79-81° C. The reaction conditions are maintained for 90 minutes after completion of the reagent feed at which point >90.0% of the monomers are consumed. A finishing solution is fed into the kettle consisting of 0.28 g tert amyl peroxypivalate, and 30 g of ethyl acetate to consume all remaining monomers to yield a nonreactive segment of theoretical $M_n$ of 67500 g/mole. The resulting solution polymer is then cooled to ambient temperature and discharged from the reactor.

The resulting acrylic copolymer contains 100% butyl acrylate based on 100% by weight of the acrylic copolymer. The measured molecular weight (Mn) of the acrylic copolymer is 54501 (determined by gel permeation chromatography relative to polystyrene standards) and the polydispersity is 1.3.

Physical Properties

Total solids content—72.0% 40 min @ 135° C.
Viscosity—7800 centipoise Spindle #5 @ 20 RPMs Brookfield RVT
Residual Butyl Acrylate—1.64%=97.6% converted 100% based on moles of methacrylic acid were targeted for cross-linking using a tri-functional Aziridine cross-linker on equal molar equivalence. The adhesive composition is dried at room temperature for 5 min, then placed in a oven for 10 min at 130° C.

Test Results

The adhesive is coated onto 2-mil polyethylene terephthalate at 58-62 grams per square meter (gsm) and dried at 130° C. for 10 minutes. The results are shown below in Table 10.

TABLE 10

| Test | Ex. 18 |
| --- | --- |
| (a) 180 peel to stainless steel 15 min dwell (lb/in) | 2.18 |
| (a) 180 peel to stainless steel 24 hours dwell (lb/in) | 3.01 cohesive |
| (a) 180 peel to stainless steel 72 hours dwell (lb/in) | 3.20 cohesive |
| (a) 180 peel to high density polyethylene 72 hr dwell (lb/in) | .36 |
| (a) 180 peel to polypropylene 72 hours dwell (lb/in) | 1.10 |
| (e) Static Shear ½ X1 X1 kg stainless (min.) | 2230.9 stain |
| (g) SAFT 2.2 lb/in² (° C.) | 200° C. |

Example 21: Preparation of Segmented Acrylic Polymer Having Methacrylic Acid Functionality Using RAFT Agent An acrylic copolymer with reactive functionalities positioned in the segment adjacent to the polymer chain ends is prepared as follows. Into a 500 ml reactor equipped with a heating jacket, agitator, reflux condenser, feed tanks and nitrogen gas inlet there is charged 27.88 g of ethyl acetate. Monomers and RAFT agent are added in the following amounts to generate the segment adjacent to the polymer chain ends.

23.80 g butyl acrylate
11.2 g of tert-butyl acrylate
1.37 g of dibenzyl trithiocarbonate (RAFT agent)
3.25 g of methacrylic acid The reactor charge is heated to reflux conditions (reactor jacket 85° C.) with a constant nitrogen purge. Once solvent reflux is attained, an initiator solution of 0.074 g 2,2'-azo-bis(isobutyronitrile) (AIBN, Vazo-64) and 7.78 g acetone is added to the reactor. After a peak temperature range of 78-80° C. is attained, the reaction conditions are maintained for 60 minutes at which point >70% of the monomers are consumed to generate reactive segments yielding a theoretical $M_n$ of 3750 g/mole each. A reagent feed mixture with an active nitrogen purge of 90.0 g ethyl acetate, 214.2 g butyl acrylate, 100.8 g tert-butyl acrylate, and 0.08 g Vazo-64 is added over a period of two and one half hours to the reactor. During the reagent feed, the temperature of the reaction is held at 79-81° C. The reaction conditions are maintained for 90 minutes after completion of the reagent feed at which point >90.0% of the monomers are consumed. A finishing solution is fed into the kettle consisting of 0.28 g tert amyl peroxypivalate, and 30 g of ethyl acetate to consume all remaining monomers to yield a nonreactive segment of theoretical $M_n$ of 67500 g/mole. The resulting solution polymer is then cooled to ambient temperature and discharged from the reactor.

The resulting acrylic copolymer contains 68% butyl acrylate, and 32% tert-butyl acrylate based on 100% by weight of the acrylic copolymer. The measured molecular weight (Mn) of the acrylic copolymer is 56700 (determined by gel permeation chromatography relative to polystyrene standards) and the polydispersity is 1.2.

Physical Properties

Total solids content—71.9% 40 min @ 135° C.

Viscosity—10,300 centipoise Spindle #5 @ 20 RPMs Brookfield RVT

Residual Butyl Acrylate—1%=97.6% converted

100% based on moles of methacrylic acid were targeted for cross-linking using a tri-functional Aziridine cross-linker on equal molar equivalence. The adhesive composition is dried at room temperature for 5 min, then placed in a oven for 10 min at 130° C.

Test Results

The adhesive is coated onto 2-mil polyethylene terephthalate at 58-62 grams per square meter (gsm) and dried at 130° C. for 10 minutes. The results are shown below in Table 11.

TABLE 11

| Test | Ex. 18 |
| --- | --- |
| (a) 180 peel to stainless steel 15 min dwell (lb/in) | 3.56 |
| (a) 180 peel to stainless steel 24 hours dwell (lb/in) | 7.52 |
| (a) 180 peel to stainless steel 72hours dwell (lb/in) | 7.51 |
| (a) 180 peel to high density polyethylene 72 hr dwell (lb/in) | .46 |
| (a) 180 peel to polypropylene 72 hours dwell (lb/in) | 2.00 |
| (e) Static Shear ½ X1 X1 kg stainless (min.) | 10000 |
| (g) SAFT 2.2 lb/in² (° C.) | 200° C. |

Example 22: Preparation of Segmented Acrylic Polymer Having Methacrylic Acid Functionality Using RAFT Agent An acrylic copolymer with reactive functionalities positioned throughout the polymer chain is prepared as follows. Into a 500 ml reactor equipped with a heating jacket, agitator, reflux condenser, feed tanks and nitrogen gas inlet there is charged 25.67 g of ethyl acetate. Monomers and RAFT agent are added in the following amounts to generate the end segment.

23.80 g butyl acrylate
11.2 g of tert-butyl acrylate
1.37 g of dibenzyl trithiocarbonate (RAFT agent)
0.33 g of methacrylic acid The reactor charge is heated to reflux conditions (reactor jacket 85° C.) with a constant nitrogen purge. Once solvent reflux is attained, an initiator solution of 0.07 g 2,2'-azo-bis(isobutyronitrile) (AIBN, Vazo-64) and 7.15 g acetone is added to the reactor. After a peak temperature range of 78-80° C. is attained, the reaction conditions are maintained for 60 minutes at which point >70% of the monomers are consumed to generate reactive segments yielding a theoretical $M_n$ of 3750 g/mole each. A reagent feed mixture with an active nitrogen purge of 93.0 g ethyl acetate, 214.2 g butyl acrylate, 100.8 g tert-butyl acrylate, 2.93 g meth-acrylic acid, and 0.08 g Vazo-64 is added over a period of two and one half hours to the reactor. During the reagent feed, the temperature of the reaction is held at 79-81° C. The reaction conditions are maintained for 90 minutes after completion of the reagent feed at which point >90.0% of the monomers are consumed. A finishing solution is fed into the kettle consisting of 0.28 g tert amyl peroxypivalate, and 30 g of ethyl acetate to consume all remaining monomers to yield a second reactive segment with a theoretical $M_n$ of 67500 g/mole. The resulting solution polymer is then cooled to ambient temperature and discharged from the reactor.

The resulting acrylic copolymer contains 68% butyl acrylate, and 32% tert-butyl acrylate based on 100% by weight of the acrylic copolymer. The measured molecular weight (Mn) of the acrylic copolymer is 52562 (determined by gel permeation chromatography relative to polystyrene standards) and the polydispersity is 1.32.

Physical Properties

Total solids content—71.7% 40 min @ 135° C.

Viscosity—9,760 centipoise Spindle #5 @ 20 RPMs Brookfield RVT

Residual Butyl Acrylate—1.12%=97.6% converted

100% based on moles of methacrylic acid were targeted for cross-linking using a tri-functional Aziridine cross-linker on equal molar equivalence. The adhesive composition is dried at room temperature for 5 min, then placed in an oven for 10 min at 130° C.

Test Results

The adhesive is coated onto 2-mil polyethylene terephthalate at 58-62 grams per square meter (gsm) and dried at 130° C. for 10 minutes. The results are shown below in Table 12.

TABLE 12

| Test | Ex. 18 |
| --- | --- |
| (a) 180 peel to stainless steel 15 min dwell (lb/in) | 2.11 |
| (a) 180 peel to stainless steel 24 hours dwell (lb/in) | 3.12 |
| (a) 180 peel to stainless steel 72 hours dwell (lb/in) | 3.58 |
| (a) 180 peel to high density polyethylene 72 hr dwell (lb/in) | .26 |
| (a) 180 peel to polypropylene 72 hours dwell (lb/in) | .64 |
| (e) Static Shear ½ X1 X1 kg stainless (min.) | 10000 removed |
| (g) SAFT 2.2 lb/in² (° C.) | 200° C. |

The following Examples illustrate the use of controlled radial polymerization for the synthesis of novel acrylic polymers of controlled molecular weight via controlled placement of reactive functional groups.

Experimental Materials

Base acrylic esters such as 2-Ethylhexyl Acrylate (EHA), Butyl Acrylate (BA), tert-Butyl Acrylate (tBA), and Isobornyl Acrylate (IBOA) were obtained from various commercial suppliers and prior to use in controlled radical polymerizations the inhibitor was removed with alumina packed columns. Functional monomers such as Methacrylic Acid (MAA), isobutoxymethylol acrylamide (IBMA), and methacryoloxypropyl tri-methoxysilane (MPtMS) were all obtained from commercial suppliers and used as is. Dibenzyl trithiocarbonate (DBTTC) was used as received and is shown in Scheme 4. Also in Scheme 4 is a depiction of how monomers are incorporated upon sequential addition. All of the polymerizations were initiated with azobis(isobutyronitrile) (AIBN). The polymers were all made in organic solvents, most typically ethyl acetate. Unless otherwise stated all MAA containing polymers were formulated with a stoichiometric equivalent (relative to equivalents of MAA) of a multifunctional aziridine cross-linker (trimethylol propane tris(N-methyl aziridinyl) propionate (TMP)). All samples were coated at approximately 2.0 mil adhesive thickness onto 2.0 mil mylar. The coatings were all air dried for 10 minutes and placed in a forced air oven for 5 minutes at 130° C. and closed with 100% solids platinum cured silicone liner.

Scheme 4. Chemical structure of dibenzyl trithiocarbonate (DBTTC) and polymers after a single monomer addition followed by a subsequent monomer addition

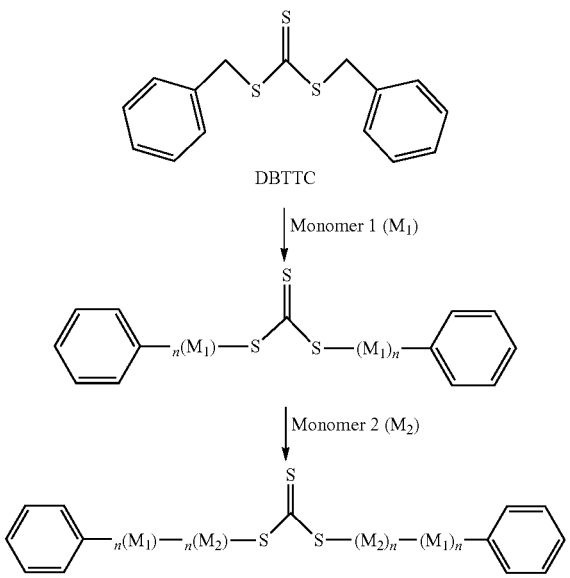

Methods

Molecular weights were measured using a Polymer Standards Services GPC outfitted with a refractive index detector and using a calibration curve using polystyrene standards. Solution viscosities were measured using a Brookfield RVT viscometer. Spindle and spindle speeds were selected such that a torque value of 40-80% was achieved for optimal accuracy. A Buchi Rotavap R-200 was used to yield a solvent free copolymer by heating the copolymer to 65° C. and by pulling a vacuum to <25 mbars. Meltflow viscosity was measured on a TA Instrument AR 1000 rheometer configured with a cone and plate clamp. This experiment was performed with a temperature sweep starting at 25° C. and finishing at 99.8° C. The Temperature ramp rate was set to a constant 1° C./minute and a shear rate (1/s) of 0.02864. Dynamic mechanical analysis (DMA) was performed on a TA Instrument AR-1000 rheometer using parallel plate clamps. 1.0 mm thick samples were placed in the clamp and annealed at 50° C. for 10 minutes to ensure good adhesion. The samples were then cooled to −80° C. for minutes and ramped at 3° C. per minute up to 180° C. During the temperature ramp the sample was oscillated at a frequency of 10 rad/s.

Unless otherwise noted, the following test methods were used for evaluating the adhesive properties of the acrylic adhesives.

| PSA PERFORMANCE TEST METHODS | |
|---|---|
| Test | Condition |
| 180° Peel | a, b |
|   15 Minute Dwell | |
|   24 Hour Dwell | |
| Shear Strength | c |
| Shear Adhesion Failure Temp. (SAFT) | d |
| (a) | Peel, sample applied to a stainless steel panelwith a 5 pound roller with 1 pass in each direction. Samples conditioned and tested at 23° C. |
| (b) | Peel, sample applied to a high density polyethylene with a 5 pound roller with 5 passes in each direction. Samples conditioned and tested at 23° C. |
| (c) | Shear: 1 kg weight with a ½ inch by 1 inch overlap. Sample applied to a stainless steel panel with a 10 pound roller with 5 passes in each direction. Samples conditioned and tested at 23° C. |
| (d) | SAFT: 1000 gram weight, 1 inch by 1 inch overlap (2.2 pounds/square inch). Sample applied to a stainless steel panel with a 10 pound roller with 5 passes in each direction. Samples conditioned for 1 hour at 23° C. and 15 minutes at 40° C. Temperature increased by 0.5° C./min. until failure. |

Results and Discussion

From a processing standpoint it would be desirable to have a lower molecular weight in order to achieve higher solids at a lower viscosity or a manageable melt viscosity. However the performance of the material dictates that the molecular weight of typical PSAs be much higher. Typical acrylic PSAs observe an increase in peel adhesion and cohesive strength with increasing molecular weight to some maximum at which the cohesive strength exceeds the adhesive strength. Then subsequent increases in molecular weight result in higher cohesive strength at the expense of adhesion. Higher molecular weight polymers display a broader range of cohesion/adhesion properties while the lower molecular weight materials are much more limited. One potential route to break this paradigm is to be able to control the cross-link density by placing reactive functional groups towards the polymer end-groups leaving mobile polymer in the middle and free chain ends for wet out.

Table 13 describes the various polymers used with regards to molecular weight, solids, solution viscosity and where applicable melt viscosity of devolatilized polymers. Copolymers of BA, tBA and MAA at the same weight ratios were synthesized using RAFT and standard free radical techniques to provide three distinct architectures. The first column labeled RAFT/Architected is a low molecular weight low polydispersity polymer in which the acid groups have been segregated into the end regions of the polymer. The amount of MAA used and the theoretical molecular weight of the polymer yield an average of 8 MAA moieties per chain or 4 per end region. In this case the MAA is polymerized in the first 5000 g/mole of the polymer. The second column entitled RAFT/Random is another low molecular weight low polydispersity polymer in which the acid groups have been randomly distributed through the entire polymer. The third column is the composition polymerized with standard techniques to provide a high molecular weight broad polydispersity control. The RAFT examples display solids contents in excess of 70% with viscosities at approximately 10,000 cps. Additionally these polymers upon devolatilization exhibit processable melt viscosities. By contrast the Standard/Random high molecular weight polymer displays a viscosity of 10,000 cps or less only when diluted to a solids content of 35.0%. Furthermore upon devolatilization the Standard/Random high molecular weight polymer becomes an intractable solid that doesn't have a relevant melt viscosity.

TABLE 13

Backbone Composition 68% BA/32% tBA, 8 MAA per chain total (4 MAA per end)

| | RAFT/ Architectured | RAFT/ Random | Standard/ Random |
|---|---|---|---|
| $M_n$ | 56,700 | 52,562 | 863,000 |
| $M_w$ | 69,600 | 69,860 | 99,000 |
| PDI | 1.2 | 1.32 | 8.7 |
| Solids | 71.9% | 71.7% | 35.6 |
| Solution viscosity | 10,300 cps | 9,760 cps | 9,700 cps |
| Melt viscosity (100° C.) | <10,000 cps | <10,000 cps | NA |

Figure 7:
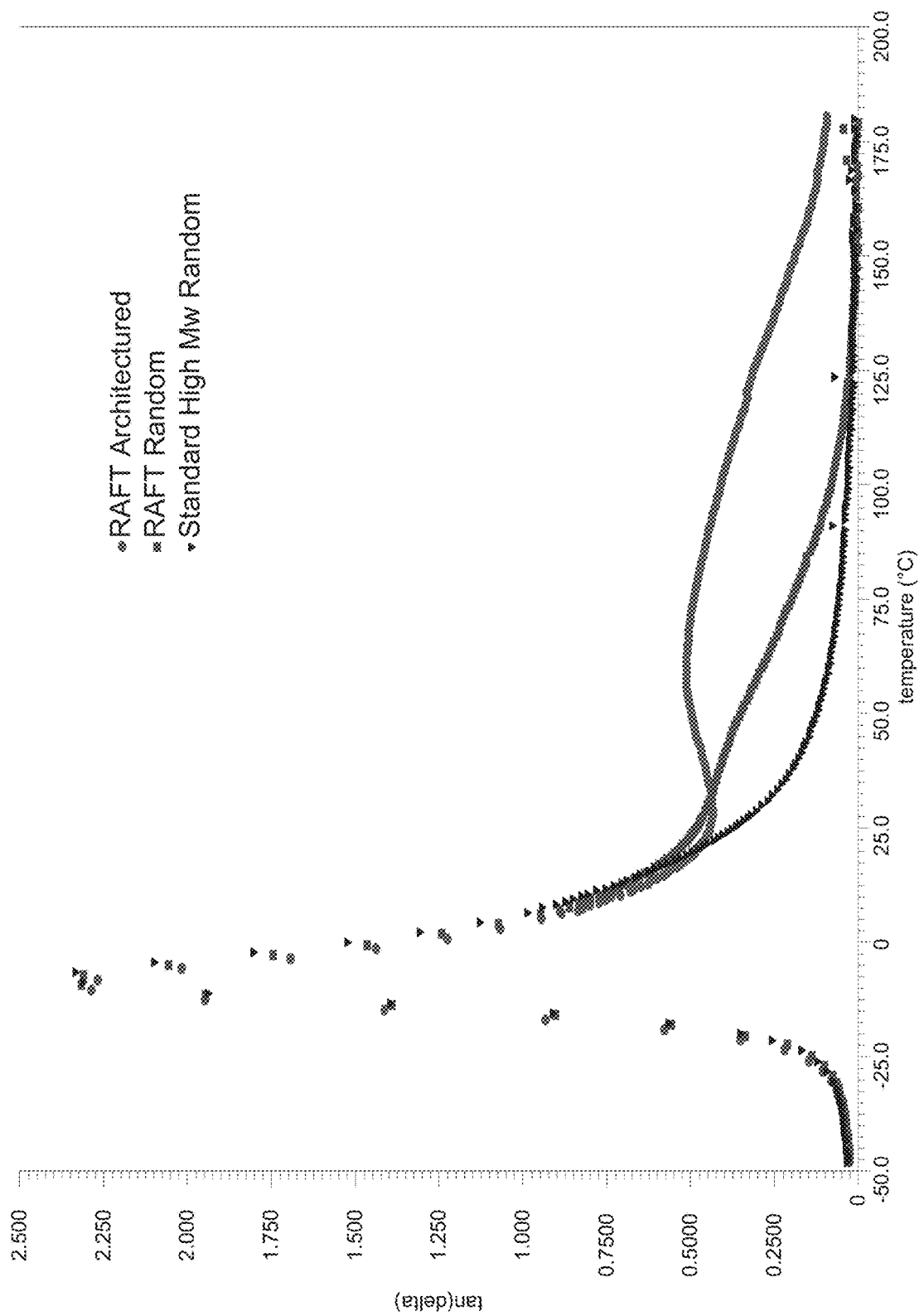
FIG. 7 is a plot of tan(delta) versus temperature for materials of Table 13.

Upon drying and cross-linking the three polymers dynamic mechanical analysis was performed to understand the differences in the visco-elastic properties and adhesive performance. FIG. 7 is a plot of tan (delta) as a function of temperature for the different materials. All of the polymers display an identical peak tan delta at approximately 0° C. which means that they are all equal in glass transition temperature. At temperatures greater than the $T_g$ the materials begin to differ substantially. For example the two low molecular weight low polydispersity polymers display nearly equivalent tan delta values at 25° C. while the high molecular weight random copolymer displays substantially lower values. The lower tan delta values are indicative of a higher molecular weight and consequently higher modulus or stiffer material. The random copolymer made via RAFT begins to display substantially lower tan delta values at temperatures greater than 30° C. In fact the low molecular weight random copolymer has tan delta values equivalent to that of the high molecular weight polymer at approximately 100° C. indicating equivalence in aggregate crosslink density. In contrast the architectured RAFT polymer displays a much different tan delta profile. The tan delta values remain higher than either random copolymer control throughout the temperature range which is indicative of higher molecular weight between cross-links.

The differences in bulk rheology manifest in markedly different pressure sensitive adhesive performance. Table 14 displays the pressure sensitive results below. The RAFT/Architectured polymer displayed high initial adhesion to steel with significant build observed to the point the adhesive was cohesively splitting. Both random copolymers displayed relatively low initial adhesion with much lower ultimate adhesion than the architectured version. The adhesion to olefin substrates was markedly higher for the architectured RAFT polymer relative to the random controls. Interestingly, no cohesive strength has been sacrificed with the enhancement in adhesion observed as evidenced by equivalent shear and SAFT values.

TABLE 14

| Test | RAFT Architectured | RAFT Random | Standard High $M_w$ Random |
|---|---|---|---|
| 180° Peel to Stainless Steel 15 min Dwell (lbs/in) | 3.56 | 2.08 | 1.82 |
| 180° Peel to Stainless Steel 72 hr Dwell (lbs/in) | 7.52 sp Tr | 3.06 | 2.00 |
| 180° Peel to HDPE 72 hr Dwell (lbs/in) | 0.5 | 0.2 | 0.29 |
| 180° Peel to Polypropylene 72 hr Dwell (lbs/in) | 1.9 | 0.58 | 0.94 |
| SAFT, 1 kg/Sq. In. (Failure Temperature, ° C.) | >200 | >200 | >200 |
| Shear, 1 kg/Sq. In. (Failure Time, Mins) | >10,000 | >10,000 | >10,000 |

Figure 8:
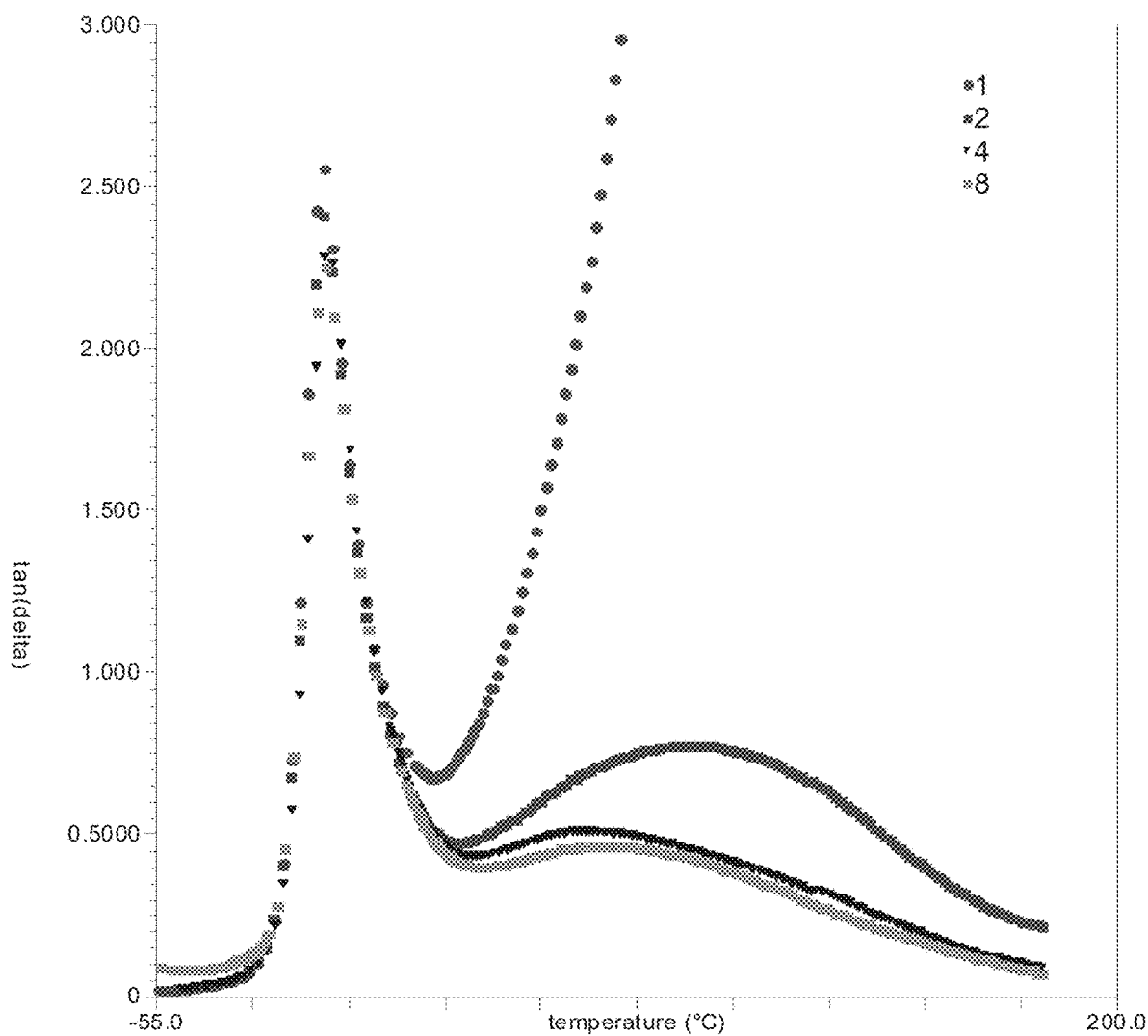
FIG. 8 is a plot of tan(delta) versus temperature for materials of Table 15.

In order to understand the influence of the concentration of acid groups in the end region of the polymer a series of polymers were synthesized in the same manor as that of the aforementioned RAFT/Architectured. Table 15 describes polymers and physical characteristics of these polymers in which the number of MAA groups were varied from one through eight (two to sixteen per polymer chain). The molecular weight and PDI of the polymers were all similar and largely the solution viscosities were the same. However upon cross-linking the polymers the bulk rheology and pressure sensitive adhesive performance changed dramatically. FIG. 8 is a plot of tan (delta) as a function of temperature for the polymers described in Table 15. All of the polymers display identical peak tan delta temperatures because of the identical backbone compositions. The polymer with one MAA per end region exhibits substantially higher tan delta values at all temperatures above the glass transition indicating that the material has a very low cross-link density. Upon increasing the MAA level to two per end significantly lower tan delta values are observed which correlates to a more cross-linked material. This trend is continued in the polymer with four acids per end region. However when increasing from four to eight MAA groups per end region, further increases in the cross-link density are not apparent. The PSA test data are shown in Table 16 for the polymers with varying amounts of acids. The polymer with one MAA per end resulted in an adhesive that exhibits cohesive failures on all test substrates with modest peel values and low shear. The material with two MAA per end yielded significantly improved performance in that it displayed high peels on stainless steel building to cohesive failure and moderate adhesion on olefins. Higher shear is observed and it narrowly misses passing the maximum SAFT. The four MAA per end polymer displayed slightly lower peel adhesions than the one with two MAA groups but still displayed values that would be considered high while passing both the shear and SAFT tests. Upon increasing to eight MAA per end region the SAFT and shear performance are maintained but the peel performance on steel begins to decrease transitioning to an adhesive failure. Also the adhesion to olefin has been adversely affected.

TABLE 15

Backbone Composition 68% BA/32% tBA Varying MAA

| Number MAA per end | 1 | 2 | 4 | 8 |
|---|---|---|---|---|
| Weight % MAA | 0.28 | 0.56 | 0.92 | 1.84 |
| $M_n$ | 51,921 | 53,600 | 56,700 | 55,300 |
| $M_w$ | 69,587 | 68,800 | 69,600 | 67,900 |
| PDI | 1.34 | 1.30 | 1.20 | 1.20 |
| Solids | 72.5% | 74.5% | 71.9% | 66.5% |
| Solution viscosity | 9,000 cps | 16,680 cps | 10,300 cps | 7,200 cps |

TABLE 16

| Test | 1 | 2 | 4 | 8 |
|---|---|---|---|---|
| 180° Peel to Stainless Steel 15 min Dwell (lbs/in) | 3.28 cohesive | 4.73 mixed | 3.56 | 2.23 |
| 180° Peel to Stainless Steel 72 hr Dwell (lbs/in) | 3.59 cohesive | 8.11 cohesive | 8.11 cohesive | 4.81 |
| 180° Peel to HDPE 72 hr Dwell (lbs/in) | 3.36 cohesive | 0.57 | 0.5 | 0.18 |
| 180° Peel to Polypropylene 72 hr Dwell (lbs/in) | 3.0 cohesive | 1.25 zipping | 2.0 | NA |
| SAFT, 1 kg/Sq. In. (Failure Temperature, °C.) | NA | 193.0 | >200 | >200 |
| Shear, 1kg/Sq. In. (Failure Time, Mins) | 2.4 cohesive | 8942.6 mixed | >10000 | >10,000 |

To illustrate the versatility of synthesizing acrylic polymers and adhesives with controlled radical techniques Table 17 describes a variety of other polymer compositions and types of cross-linking. The pressure sensitive adhesive performances of these formulations are displayed in Table 18 below. The polymers described display high solids with relatively low viscosities. Sample 1 is a BA homopolymer polymerized with three self condensing methylol acrylamide (IBMA) monomers per end region and formulated with 20% of a terpene phenolic tackifier. Sample 1 exhibits moderate adhesion to stainless steel, average adhesion to olefin substrates with relatively high shear. Sample 2 is an EHA homopolymer with three self condensing alkoxysilane monomers per end region and formulated with 40% of a polyterpene tackifier. Interestingly, this particular formulation displays high adhesion across all substrates with moderate shear and SAFT results. Sample 3 is a similar composition to the polymers described in Table 16 but differs in that it utilizes one self condensing alkoxysilane monomer per end region in place of the acid aziridine crosslinking. It is interesting to note that only one alkoxy-silane functionality yielded substantially higher shear than the analogous MAA containing polymer. Finally Sample 4 is an EHA/IBOA copolymer with four methacrylic acids per end region with aziridine crosslinking. Sample 4 as a consequence of its low surface energy backbone displays excellent adhesion to not only the steel substrates but to the olefin substrates as well while exhibiting relatively high cohesive strength as evidenced by the shear and SAFT numbers.

TABLE 17

Various Backbone Compositions, Formulations and Cross-Linkers

| Sample | 1 | 2 | 3 | 4 |
|---|---|---|---|---|
| Backbone composition | BA | EHA | 68BA/32tBA | 65EHA/35IBOA |
| Cross-linking monomer/# per end | IBMA/3 | MMtMS/3 | MMtMS/1 | MAA/4 |
| Tackifier level/type | 20% Terpene phenolic | 40% Polyterpene | NA | NA |
| $M_n$ | 62,840 | 35,000 | 87,100 | 54,600 |
| $M_w$ | 86,520 | 61,950 | 130,000 | 87,360 |
| PDI | 1.38 | 1.77 | 1.5 | 1.6 |
| Solids | 71.6 | 73.6 | 65.8 | 71.5 |
| Solution viscosity | 4,800 cps | 2,850 cps | 9,800 cps | 8,700 cps |

TABLE 18

| Test | 1 | 2 | 4 | 8 |
|---|---|---|---|---|
| 180° Peel to Stainless Steel 15 min Dwell (lbs/in) | 2.5 | 6.84 cohesive | 4.20 | 8.20 cohesive |

TABLE 18-continued

| Test | 1 | 2 | | 4 | | 8 | |
|---|---|---|---|---|---|---|---|
| 180° Peel to Stainless Steel 72 hr Dwell (lbs/in) | 4.5 | 7.11 | cohesive | 5.96 | mixed | 8.70 | cohesive |
| 180° Peel to HDPE 72 hr Dwell (lbs/in) | 1.2 | 6.44 | cohesive | 0.41 | | 3.11 | |
| 180° Peel to Polypropylene 72 hr Dwell (lbs/in) | 1.5 zipping | 6.26 | cohesive | 1.59 | zipping | 5.5 | cohesive zipping |
| SAFT, 1 kg/Sq. In. (Failure Temperature, ° C.) | NA | 88.0 | adhesive | 89.0 | | 94.0 | |
| Shear, 1 kg/Sq. In. (Failure Time, Mins) | >10000 | 2460.2 | cohesive | 773 | | 5844 | |

Figure 9:
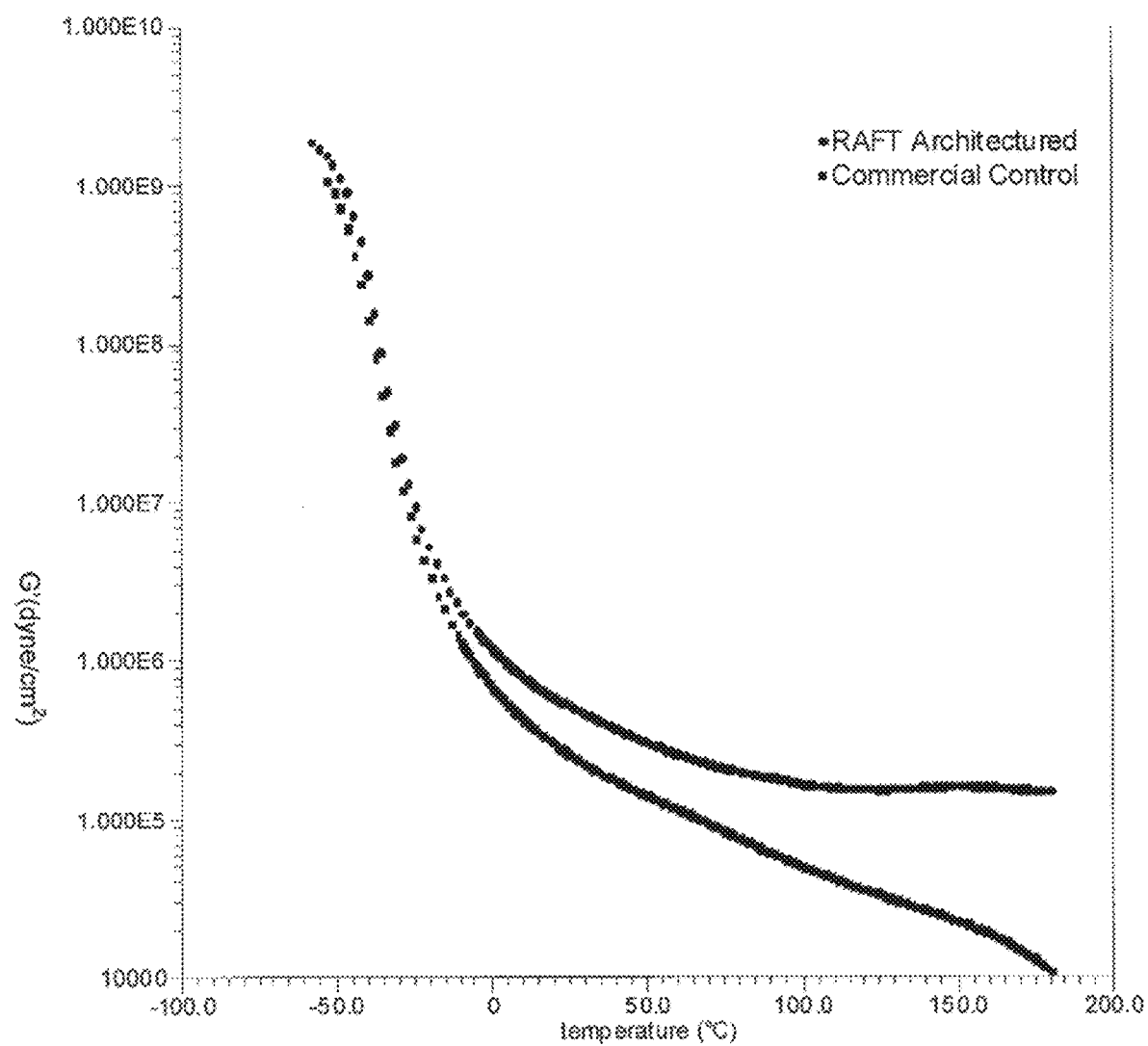
FIG. 9 is a plot of storage modulus (G') as a function of temperature.

All of the aforementioned systems consisted of a single functional monomer and corresponding cross-linking system. The acid/aziridine systems offer advantages such as the adhesion promotion of the acid groups and the facile covalent cross-linking. However, these systems have the disadvantage of being two part systems. The self condensing systems in particular the alkoxy silane monomers are advantageous in that they are one part systems but lack the speed of cure of an acid aziridine reaction. Materials that incorporate both types of functionalities could provide for the desired properties of both systems. Table 19 describes polymers of the same backbone composition with varying amount of self condensing alkoxysilane monomer and architecture. Because these polymers contain acrylic acid as part of the backbone composition and self condensing alkoxysilane monomers in the end regions the opportunity exists to have two independent cross-linking reactions. The polymers described in Table 19 are all formulated with aluminum acetoacetonate (AAA) at 0.5% on solids and pentanedione as a stabilizer. The AAA serves to rapidly cross-link the acid moieties as well as serving as a Lewis acid catalyst for the alkoxysilane functionalities. FIG. 9 is a plot of storage modulus (G') as a function of temperature. All of the polymers display an identical drop in storage modulus at approximately −35° C. which roughly corresponds to the glass transition temperature. The RAFT/Architectured polymer displays a relatively flat plateau modulus that extends past 150° C. and is overall higher in modulus than the random copolymer commercial control. The random commercial control displays markedly different behavior in that the plateau modulus is not flat and slopes significantly down with increasing temperature. Furthermore at temperatures exceeding 150° C. the decrease in G' has accelerated such that the material could be characterized as free flowing. The influence of the bulk rheology is evident in the pressure sensitive adhesive properties of the polymers that are detailed in Table 20. The polymers all exhibit nearly identical peel performance on all substrates. The architectured polymers display an enhancement in cohesive strength and high temperature performance as evidenced by the shear and SAFT results.

TABLE 19

51 EHA 45 BA 4 AA

| Type | RAFT/Architectured | Commercial Control |
|---|---|---|
| # of MMtMS | 1 | 0 |
| $M_n$ | 80,060 | 61,531 |
| $M_w$ | 127,540 | 380,961 |
| PDI | 1.6 | 6.2 |
| Solids | 69.0 | 50.0 |
| Solution Viscosity | 16,000 cps | 5,000 cps |

TABLE 20

| Test | RAFT/Architectured | Commercial Control |
|---|---|---|
| 180° Peel to Stainless Steel 15 min Dwell (lbs/in) | 3.5 | 3.8 |
| 180° Peel to Stainless Steel 72 hr Dwell (lbs/in) | 8.4 cohesive | 7.5 cohesive |
| 180° Peel to HDPE 72 hr Dwell (lbs/in) | 0.3 | 0.5 |
| 180° Peel to Polypropylene 72 hr Dwell (lbs/in) | 2.35 | 1.20 zipping |
| SAFT, 1 kg/Sq. In. (Failure Temperature, ° C.) | >200 | 90 |
| Shear, 1 kg/Sq. In. (Failure Time, Mins) | 1200 | 400 |

While the invention has been explained in relation to various of its embodiments, it is to be understood that various modifications thereof will be apparent to those skilled in the art upon reading the specification. The features of the various embodiments of the articles described herein may be combined within an article. Therefore, it is to be understood that the invention described herein is intended to cover such modifications as fall within the scope of the appended claims.

What is claimed is:

1. A crosslinkable composition comprising:
    at least one acrylic copolymer comprising at least one reactive segment of controlled size and position and at least one non-reactive segment of controlled size and position,
    the at least one reactive segment comprising copolymers derived from (i) one or more of monomers of at least one non-reactive segment and (ii) at least one polymerizable comonomer comprising a crosslinkable functionality,
    wherein the one or more monomers of the at least one non-reactive segment is the same type of monomer of the at least one non-reactive segment present in the at least one reactive segment, wherein the one or more monomers of the at least one non-reactive segment are present in the at least one reactive segment in an amount effective for the at least one reactive segment and the at least one non-reactive segment to be molecularly miscible before cure, and wherein the at least one non-reactive segment of the acrylic copolymer is derived from monomers selected from the group consisting of $C_1$ to about $C_{20}$ alkyl, aryl, or cyclic acrylates, $C_1$ to about $C_{20}$ alkyl, aryl, or cyclic methacrylates, or mixtures thereof.

2. The composition of claim 1 comprising two reactive segments and one non-reactive segment.

3. The composition of claim 1 comprising one reactive segment and two non-reactive segments.

4. The composition of claim 1 comprising a first reactive segment comprising a monomer having a first functional group, and a second reactive segment comprising a monomer having a second functional group.

5. The composition of claim 1 wherein the at least one reactive segment comprises at least one monomer having the formula:

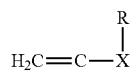

where R is H or $CH_3$ and X represents or contains a functional group capable of crosslinking.

6. The composition of claim 1 wherein the at least one reactive segment contains at least one functional group chosen from silyl, hydroxyl, carboxyl, carbonyl, carbonate ester, isocyanate, anhydride, acidic, epoxy, vinyl, (meth)acrylate, amino, amide, imide, siloxy, mercapto, thiol, alkoxy, oxazole, acetoacetyl, acetoacetoxy, and acrylamide groups.

7. The composition of claim 1 wherein the at least one reactive segment comprises at least one monomer having the formula:

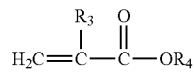

where $R_3$ is H or $CH_3$ and $R_4$ is a branched or unbranched, saturated alkyl group having 4 to 14 carbon atoms.

8. The composition of claim 1 wherein the at least one reactive segment comprises an unsaturated carboxylic acid containing from 3 to about 20 carbon atoms.

9. The composition of claim 1 wherein the at least one reactive segment comprises an acrylamide.

10. The composition of claim 1 wherein the position of the at least one reactive segment and the at least one non-reactive segment are controlled by RAFT agent.

11. The composition of claim 1 wherein the position of the at least one reactive segment and the at least one non-reactive segment are controlled by a SFRP agent.

12. The composition of claim 1 wherein the average molecular weight (Mn) of the at least one acrylic copolymer is in the range of about 10,000 g/mole to about 200,000 g/mole.

13. The composition of claim 1 wherein the average molecular weight (Mn) of the at least one acrylic copolymer is in the range of about 25,000 g/mole to about 75,000 g/mole.

14. The composition of claim 1 further comprising a crosslinker.

15. The composition of claim 1 wherein the at least one acrylic copolymer has a polydispersity of less than 3.0.

16. A pressure sensitive adhesive comprising the composition of claim 1,
wherein the crosslinkable functional groups are crosslinked.

17. A foam comprising the composition of claim 1.

18. An elastomer comprising the composition of claim 1.

19. The pressure sensitive adhesive of claim 16 further comprising a tackifier.

20. The composition of claim 1 wherein the at least one reactive segment comprises at least two reactive functional groups.

21. A method of preparing a pressure sensitive adhesive comprising the steps of:
polymerizing using a controlled radical polymerization process at least one monomer comprising at least one reactive functional group capable of undergoing a crosslinking reaction to form a reactive segment of controlled molecular weight and position;
polymerizing using a controlled radical polymerization process at least one monomer that is non-reactive with the reactive functional group of the reactive segments to form one non-reactive segment of controlled molecular weight and position;
forming an acrylic polymer from the reactive segment and the non-reactive segment;
crosslinking the acrylic polymer by mixing the acrylic polymer with an amount of a crosslinking agent;
wherein the one or more monomers of the non-reactive segment are present in the reactive segment in an amount effective for the reactive segments and the non-reactive segment to be molecularly miscible before cure,
the reactive segments comprising copolymers derived from (i) one or more of the monomers of the non-reactive segment and (ii) at least one polymerizable comonomer comprising a crosslinkable functionality, and
wherein the non-reactive segment of the acrylic copolymer is derived from monomers selected from the group consisting of $C_1$ to about $C_{20}$ alkyl, aryl, or cyclic acrylates, $C_1$ to about $C_{20}$ alkyl, aryl, or cyclic methacrylates, or mixtures thereof.

22. The method of claim 21 wherein the reactive segment is polymerized first in the presence of a RAFT agent.

23. The method of claim 21 wherein the non-reactive segment is polymerized first in the presence of a RAFT agent, the polymerization is terminated after the complete conversion of the at least one monomer comprising at least one reactive functional group to form the reactive segment(s).

24. The method of claim 21 wherein the non-reactive segment is polymerized first in the presence of an SFRP agent.

25. The method of claim 21 wherein the reactive segment is polymerized first in the presence of an SFRP agent.

26. The method of claim 21 further comprising the step of crosslinking the functional groups of the reactive segment.

27. The composition of claim 1 wherein the at least one non-reactive segment being non-reactive with the functional group of the at least one reactive segment.

28. The composition of claim 1 wherein the functional group is in a non-terminal position in the copolymer.

29. The composition of claim 1 wherein the position of the at least one reactive segment and the at least one non-reactive segment are controlled by a controlled radical polymerization process.

30. The composition of claim 1 wherein the position of the at least one reactive segment and the at least one non-reactive segment are controlled by a controlled radical polymerization process selected from the group consisting of atom-transfer radical polymerization (ATRP), reversible addition-fragmentation chain transfer (RAFT), stable free radical polymerization (SFRP), and nitroxide-mediated polymerization (NMP).

31. A crosslinkable composition comprising:
   at least one acrylic copolymer comprising at least one reactive segment of controlled size and position and at least one non-reactive segment of controlled size and position,
   the at least one reactive segment comprising copolymers derived from (i) one or more monomers of the at least one non-reactive segment and (ii) at least one polymerizable comonomer comprising a crosslinkable functionality,
   wherein the one or more monomers of the at least one non-reactive segment are present in the at least one reactive segment in an amount effective for the at least one reactive segment and the at least one non-reactive segment to be molecularly miscible before cure.

32. The composition of claim 31 wherein the one or more monomers present in the at least one non-reactive segment is the same type of monomer of the at least one non-reactive segment present in the at least one reactive segment.

33. The composition of claim 31 wherein the at least one reactive segment comprises at least one monomer having the formula:

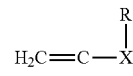

where R is H or $CH_3$ and X represents or contains a functional group capable of crosslinking.

34. The composition of claim 31 wherein the at least one reactive segment contains at least one functional group chosen from silyl, hydroxyl, carboxyl, carbonyl, carbonate ester, isocyanate, anhydride, acidic, epoxy, vinyl, (meth) acrylate, amino, amide, imide, siloxy, mercapto, thiol, alkoxy, oxazole, acetoacetyl, acetoacetoxy, and acrylamide groups.

35. The composition of claim 31 wherein the at least one non-reactive segment of the acrylic copolymer is derived from one or more monomers selected from the group consisting of $C_1$ to about $C_{20}$ alkyl, aryl, or cyclic acrylates, $C_1$ to about $C_{20}$ alkyl, aryl, or cyclic methacrylates, or mixtures thereof.

36. The composition of claim 31 wherein the functional group is in a non-terminal position in the copolymer.

* * * * *